(12) United States Patent
Mori

(10) Patent No.: US 7,480,105 B2
(45) Date of Patent: Jan. 20, 2009

(54) IMAGING LENS AND IMAGING APPARATUS

(75) Inventor: Masao Mori, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/730,845

(22) Filed: Apr. 4, 2007

(65) Prior Publication Data
US 2007/0236811 A1 Oct. 11, 2007

(30) Foreign Application Priority Data
Apr. 5, 2006 (JP) ............... P2006-104004

(51) Int. Cl.
G02B 13/18 (2006.01)
G02B 3/02 (2006.01)
(52) U.S. Cl. .................... 359/770; 359/714
(58) Field of Classification Search ........... 359/682, 359/714, 770, 763, 753, 754
See application file for complete search history.

(56) References Cited
U.S. PATENT DOCUMENTS
6,744,570 B1 6/2004 Isono
6,825,993 B2 * 11/2004 Noda ................ 359/753
2003/0156336 A1 8/2003 Hoshi
2003/0174410 A1 9/2003 Noda
2004/0095503 A1 5/2004 Iwasawa et al.
2004/0189833 A1 9/2004 Magimori et al.
2005/0259333 A1 11/2005 Matsusaka FOREIGN PATENT DOCUMENTS
JP 2004-184987 A 7/2004
JP 2004-212481 A 7/2004
JP 2005-4027 A 1/2005
JP 2005-31638 A 2/2005

* cited by examiner

*Primary Examiner*—Alicia M Harrington
(74) *Attorney, Agent, or Firm*—Birch, Stewart, Kolasch & Birch, LLP

(57) ABSTRACT

An imaging lens comprises, in order arranged from an object side: a first lens of a negative meniscus lens which is curved to be convex towards an object; a second lens of a positive lens which is curbed to be convex on an object side surface thereof; a diaphragm; a third lens which is curved to be convex towards an image; a fourth lens having a positive refractive power in the vicinity of an optical axis; and a fifth lens which is curved to be concave towards the image in the vicinity of the optical axis while being curved to convex towards the image along a circumferential edge portion on an image side surface thereof.

27 Claims, 26 Drawing Sheets

EXAMPLE 1

EXAMPLE 2

EXAMPLE 3

| EXAMPLE 1: BASE LENS DATA | | | | | |
|---|---|---|---|---|---|
| | Si (SURFACE NUMBERS) | Ri (CURVATURES OF RADIUS) | Di (SURFACE SPACE) | nei (REFRACTIVE INDEXES) | vej (ABBE NUMBERS) |
| G1 | 1 | 5.494 | 1.23 | 1.93428 | 18.7 |
| | 2 | 3.661 | 0.20 | 1.00000 | |
| G2 | 3 | 3.798 | 1.90 | 1.75844 | 52.1 |
| | 4 | 17.182 | 0.04 | 1.00000 | |
| | 5 (DIAPHRAGM) | — | 1.91 | 1.00000 | |
| G3 | 6 | −8.221 | 1.26 | 1.53342 | 55.4 |
| | 7 | −15.166 | 0.53 | 1.00000 | |
| G4 | 8 | 7.743 | 1.25 | 1.53342 | 55.4 |
| | 9 | −11.231 | 0.47 | 1.00000 | |
| G5 | 10 | 4.314 | 1.02 | 1.51223 | 56.2 |
| | 11 | 2.296 | 1.50 | 1.00000 | |
| GC | 12 | ∞ | 0.50 | 1.51872 | 64.0 |
| | 13 | ∞ | 0.00 | 1.00000 | |

FIG. 5

| EXAMPLE 1: ASPHERIC SURFACE DATA | | | |
|---|---|---|---|
| ASPHERICAL COEFFICIENTS | SURFACE LOCATION | | |
| | G3 FRONT SURFACE | G3 REAR SURFACE | G4 FRONT SURFACE |
| K | -9.986877E+00 | 8.224392E+00 | -9.993084E+00 |
| $A_3$ | 5.989398E-03 | -3.840897E-03 | -1.871737E-02 |
| $A_4$ | -3.067386E-02 | -1.013879E-02 | 5.300968E-02 |
| $A_5$ | 2.025477E-02 | -4.022028E-03 | -3.214749E-02 |
| $A_6$ | -4.918092E-03 | 2.353771E-03 | 5.782795E-03 |
| $A_7$ | -2.881389E-03 | -9.162183E-04 | 7.075921E-04 |
| $A_8$ | 7.658792E-04 | -6.956290E-05 | -7.004711E-04 |
| $A_9$ | 6.801034E-04 | 2.415209E-04 | 1.812005E-04 |
| $A_{10}$ | -2.595185E-04 | -6.101717E-05 | -1.969674E-05 |
| | G4 REAR SURFACE | G5 FRONT SURFACE | G5 REAR SURFACE |
| K | 7.757463E+00 | 1.862640E-01 | -3.533314E+00 |
| $A_3$ | 1.830738E-02 | 4.833454E-02 | 3.004335E-02 |
| $A_4$ | 3.110322E-02 | -3.976887E-02 | -1.129500E-02 |
| $A_5$ | -6.434236E-03 | -1.071861E-03 | -1.371737E-02 |
| $A_6$ | -5.193037E-03 | 1.237123E-03 | 6.509845E-03 |
| $A_7$ | 6.345410E-04 | 6.316887E-04 | -1.275859E-04 |
| $A_8$ | 7.828093E-04 | -1.953689E-04 | -5.055767E-04 |
| $A_9$ | -2.562410E-04 | 1.857358E-05 | 1.233387E-04 |
| $A_{10}$ | 2.386665E-05 | -1.330768E-06 | -9.443200E-06 |

FIG. 6

| | EXAMPLE 2: BASE LENS DATA | | | | |
|---|---|---|---|---|---|
| | Si (SURFACE NUMBERS) | Ri (CURVATURES OF RADIUS) | Di (SURFACE SPACE) | nei (REFRACTIVE INDEXES) | vej (ABBE NUMBERS) |
| G1, G2 | 1 | 5.209 | 0.85 | 1.93428 | 18.7 |
| | 2 | 3.258 | 1.54 | 1.88814 | 40.5 |
| | 3 | 10.152 | 0.27 | 1.00000 | |
| | 4 (DIAPHRAGM) | — | 1.48 | 1.00000 | |
| G3 | 5 | −11.627 | 1.05 | 1.51223 | 56.2 |
| | 6 | −25.253 | 0.62 | 1.00000 | |
| G4 | 7 | 12.732 | 1.21 | 1.51223 | 56.2 |
| | 8 | −3.951 | 0.30 | 1.00000 | |
| G5 | 9 | 11.332 | 0.97 | 1.51223 | 56.2 |
| | 10 | 2.572 | 1.50 | 1.00000 | |
| | 11 | ∞ | 0.50 | 1.51872 | 64.0 |
| | 12 | ∞ | 0.00 | 1.00000 | |

FIG. 7

| EXAMPLE 2: ASPHERIC SURFACE DATA | | | |
|---|---|---|---|
| ASPHERICAL COEFFICIENTS | SURFACE LOCATION | | |
| | G3 FRONT SURFACE | G3 REAR SURFACE | G4 FRONT SURFACE |
| $K$ | -3.000213E-01 | -1.000013E+01 | 9.116900E+00 |
| $A_3$ | -8.854803E-04 | -1.217430E-02 | -1.871349E-02 |
| $A_4$ | -1.885480E-02 | 9.268421E-03 | 6.310926E-02 |
| $A_5$ | 1.337441E-02 | -1.984958E-02 | -3.701754E-02 |
| $A_6$ | -9.404664E-03 | 4.858927E-03 | 5.477991E-03 |
| $A_7$ | 1.810810E-03 | 9.423245E-04 | 9.921780E-04 |
| $A_8$ | 2.078279E-03 | -3.473370E-04 | -6.545074E-04 |
| $A_9$ | -1.407487E-03 | -6.874667E-05 | 1.714212E-04 |
| $A_{10}$ | 2.817145E-04 | 3.751802E-05 | -2.134652E-05 |
| | G4 REAR SURFACE | G5 FRONT SURFACE | G5 REAR SURFACE |
| $K$ | -6.798694E+00 | 5.909659E+00 | -4.707476E+00 |
| $A_3$ | 6.827673E-02 | 1.108632E-01 | 3.936190E-02 |
| $A_4$ | 1.013730E-02 | -5.901011E-02 | -1.390984E-02 |
| $A_5$ | -5.129981E-03 | -1.108340E-04 | -1.323622E-02 |
| $A_6$ | -4.923097E-03 | 1.540790E-03 | 6.214968E-03 |
| $A_7$ | 6.633988E-04 | 6.253200E-04 | -1.037398E-04 |
| $A_8$ | 7.725807E-04 | -2.016924E-04 | -4.980194E-04 |
| $A_9$ | -2.551446E-04 | 1.804912E-05 | 1.233050E-04 |
| $A_{10}$ | 2.297832E-05 | -1.059681E-06 | -9.538850E-06 |

FIG. 8

| | Si (SURFACE NUMBERS) | Ri (CURVATURES OF RADIUS) | Di (SURFACE SPACE) | nei (REFRACTIVE INDEXES) | vej (ABBE NUMBERS) |
|---|---|---|---|---|---|
| | \multicolumn{5}{c}{EXAMPLE 3: BASE LENS DATA} |
| | 1 | 5.841 | 0.82 | 1.85503 | 23.6 |
| | 2 | 3.448 | 2.06 | 1.83945 | 42.5 |
| | 3 | 15.054 | 0.23 | 1.00000 | |
| | 4 (DIAPHRAGM) | — | 1.77 | 1.00000 | |
| G3 | 5 | -2.973 | 1.36 | 1.51222 | 56.2 |
| | 6 | -2.274 | 0.10 | 1.00000 | |
| G4 | 7 | 37.002 | 1.26 | 1.53386 | 55.4 |
| | 8 | -4.035 | 0.10 | 1.00000 | |
| G5 | 9 | 35.237 | 0.90 | 1.53386 | 55.4 |
| | 10 | 2.249 | 1.50 | 1.00000 | |
| GC | 11 | ∞ | 0.50 | 1.51872 | 64.0 |
| | 12 | ∞ | 0.00 | 1.00000 | |

FIG. 9

| EXAMPLE 3: ASPHERIC SURFACE DATA ||||
|---|---|---|---|
| ASPHERICAL COEFFICIENTS | SURFACE LOCATION |||
| | G3 FRONT SURFACE | G3 REAR SURFACE | G4 FRONT SURFACE |
| K | 1.274219E+00 | -4.362449E+00 | -5.511064E+01 |
| $A_3$ | 6.452877E-03 | 8.912314E-03 | -1.683108E-02 |
| $A_4$ | -2.371949E-02 | -8.505743E-02 | 1.794478E-02 |
| $A_5$ | 1.106230E-02 | 3.238172E-02 | -6.806179E-03 |
| $A_6$ | -3.235274E-03 | 2.197562E-04 | -7.120345E-04 |
| $A_7$ | -1.393420E-03 | -2.421042E-03 | 5.564098E-04 |
| $A_8$ | 4.071858E-04 | -1.400612E-04 | -2.374425E-04 |
| $A_9$ | 5.179545E-05 | 1.776913E-06 | 1.284972E-04 |
| $A_{10}$ | 1.407628E-04 | 8.413018E-05 | -2.361062E-05 |
| | G4 REAR SURFACE | G5 FRONT SURFACE | G5 REAR SURFACE |
| K | -3.200399E+01 | -2.293403E+00 | -8.180491E+00 |
| $A_3$ | -2.501363E-02 | 3.189333E-02 | 5.171738E-02 |
| $A_4$ | 3.246162E-02 | -3.934771E-02 | -6.272494E-02 |
| $A_5$ | -9.389409E-03 | 3.478920E-03 | 2.223241E-02 |
| $A_6$ | -3.607155E-03 | 3.212423E-03 | -2.550186E-03 |
| $A_7$ | 6.642079E-04 | -5.423670E-05 | -2.625013E-04 |
| $A_8$ | 7.166619E-04 | -3.412814E-04 | 6.858974E-05 |
| $A_9$ | -2.348215E-04 | 7.148034E-05 | -2.110443E-06 |
| $A_{10}$ | 1.980470E-05 | -4.389345E-06 | -1.047950E-07 |

FIG. 10

| | EXAMPLE 4: BASE LENS DATA | | | | |
|---|---|---|---|---|---|
| | Si (SURFACE NUMBERS) | Ri (CURVATURES OF RADIUS) | Di (SURFACE SPACE) | nei (REFRACTIVE INDEXES) | vej (ABBE NUMBERS) |
| G1, G2 | 1 | 4.562 | 1.00 | 1.85503 | 23.6 |
| | 2 | 2.774 | 1.68 | 1.75844 | 52.1 |
| | 3 | 10.545 | 0.15 | 1.00000 | |
| | 4 (DIAPHRAGM) | — | 1.60 | 1.00000 | |
| G3 | 5 | -7.348 | 0.92 | 1.51223 | 56.2 |
| | 6 | -35.934 | 0.46 | 1.00000 | |
| G4 | 7 | 10.680 | 1.21 | 1.53676 | 41.8 |
| | 8 | -3.788 | 0.38 | 1.00000 | |
| G5 | 9 | 13.902 | 0.93 | 1.51223 | 56.2 |
| | 10 | 2.650 | 1.50 | 1.00000 | |
| GC | 11 | ∞ | 0.50 | 1.51872 | 64.0 |
| | 12 | ∞ | 0.44 | 1.00000 | |

FIG. 11

| EXAMPLE 4: ASPHERIC SURFACE DATA | | | |
|---|---|---|---|
| ASPHERICAL COEFFICIENTS | SURFACE LOCATION | | |
| | G3 FRONT SURFACE | G3 REAR SURFACE | G4 FRONT SURFACE |
| K | -1.279349E+00 | -6.863615E+00 | 6.052351E+00 |
| $A_3$ | 4.080741E-03 | -1.602219E-03 | -1.098124E-02 |
| $A_4$ | -3.912357E-02 | -2.594136E-02 | 4.547111E-02 |
| $A_5$ | 2.677724E-02 | 4.678970E-03 | -2.572659E-02 |
| $A_6$ | -7.342472E-03 | 2.049231E-03 | 3.334175E-03 |
| $A_7$ | -2.130371E-03 | -2.100210E-03 | 6.662409E-04 |
| $A_8$ | 9.502886E-04 | -2.617505E-06 | -5.404242E-04 |
| $A_9$ | 4.036484E-04 | 4.839265E-04 | 1.997400E-04 |
| $A_{10}$ | -1.357274E-04 | -9.619610E-05 | -2.920996E-05 |
| | G4 REAR SURFACE | G5 FRONT SURFACE | G5 REAR SURFACE |
| K | -7.392024E+00 | 8.771511E+00 | -7.870973E+00 |
| $A_3$ | 4.529983E-02 | 9.540079E-02 | 5.815111E-02 |
| $A_4$ | 2.820572E-02 | -4.478981E-02 | -2.388370E-02 |
| $A_5$ | -9.235785E-03 | -2.509348E-03 | -1.009997E-02 |
| $A_6$ | -5.063605E-03 | 1.019709E-03 | 5.862800E-03 |
| $A_7$ | 7.368538E-04 | 6.670858E-04 | -2.343812E-04 |
| $A_8$ | 8.004503E-04 | -1.780794E-04 | -4.841566E-04 |
| $A_9$ | -2.569846E-04 | 2.021388E-05 | 1.311898E-04 |
| $A_{10}$ | 2.186020E-05 | -1.838413E-06 | -1.067093E-05 |

FIG. 12

| | EXAMPLE 5: BASE LENS DATA | | | | |
|---|---|---|---|---|---|
| | Si (SURFACE NUMBERS) | Ri (CURVATURES OF RADIUS) | Di (SURFACE SPACE) | nei (REFRACTIVE INDEXES) | vej (ABBE NUMBERS) |
| G1, G2 | 1 | 4.621 | 0.85 | 1.70442 | 29.9 |
| G1, G2 | 2 | 2.636 | 1.79 | 1.69979 | 55.3 |
| G1, G2 | 3 | 11.086 | 0.21 | 1.00000 | |
| | 4 (DIAPHRAGM) | — | 1.64 | 1.00000 | |
| G3 | 5 | -5.723 | 0.95 | 1.51223 | 56.2 |
| G3 | 6 | -15.014 | 0.44 | 1.00000 | |
| G4 | 7 | 12.864 | 1.21 | 1.51223 | 56.2 |
| G4 | 8 | -3.247 | 0.39 | 1.00000 | |
| G5 | 9 | 21.200 | 0.89 | 1.51223 | 56.2 |
| G5 | 10 | 2.637 | 1.50 | 1.00000 | |
| GC | 11 | ∞ | 0.50 | 1.51872 | 64.0 |
| GC | 12 | ∞ | 0.65 | 1.00000 | |

FIG. 13

| EXAMPLE 5: ASPHERIC SURFACE DATA | | | |
|---|---|---|---|
| ASPHERICAL COEFFICIENTS | SURFACE LOCATION | | |
| | G3 FRONT SURFACE | G3 REAR SURFACE | G4 FRONT SURFACE |
| K | -2.279259E+00 | -9.944802E+00 | -4.094293E+00 |
| $A_3$ | 4.298417E-03 | 1.984332E-03 | -2.523580E-03 |
| $A_4$ | -3.768647E-02 | -1.949503E-02 | 4.975896E-02 |
| $A_5$ | 2.628821E-02 | -4.224057E-05 | -2.981130E-02 |
| $A_6$ | -8.483367E-03 | 2.005583E-03 | 3.921341E-03 |
| $A_7$ | -2.192511E-03 | -1.687319E-03 | 9.260181E-04 |
| $A_8$ | 1.298170E-03 | 7.638456E-05 | -5.692812E-04 |
| $A_9$ | 4.798805E-04 | 4.609602E-04 | 1.810763E-04 |
| $A_{10}$ | -2.034587E-04 | -1.046975E-04 | -2.583288E-05 |
| | G4 REAR SURFACE | G5 FRONT SURFACE | G5 REAR SURFACE |
| K | -5.236339E+00 | -5.728350E-01 | -7.544366E+00 |
| $A_3$ | 6.735390E-02 | 1.153473E-01 | 5.662403E-02 |
| $A_4$ | 2.145659E-02 | -5.309099E-02 | -2.113400E-02 |
| $A_5$ | -9.935220E-03 | -1.928316E-03 | -1.204825E-02 |
| $A_6$ | -4.853699E-03 | 1.265721E-03 | 6.144358E-03 |
| $A_7$ | 8.429911E-04 | 6.688143E-04 | -1.656221E-04 |
| $A_8$ | 7.942189E-04 | -1.849103E-04 | -4.916337E-04 |
| $A_9$ | -2.647499E-04 | 1.929789E-05 | 1.276091E-04 |
| $A_{10}$ | 2.287287E-05 | -1.584375E-06 | -1.019572E-05 |

FIG. 14

| | EXAMPLE 6: BASE LENS DATA | | | | |
|---|---|---|---|---|---|
| | Si (SURFACE NUMBERS) | Ri (CURVATURES OF RADIUS) | Di (SURFACE SPACE) | nei (REFRACTIVE INDEXES) | vej (ABBE NUMBERS) |
| G1, G2 | 1 | 4.280 | 0.85 | 1.93428 | 18.7 |
| | 2 | 2.989 | 1.67 | 1.69979 | 55.3 |
| | 3 | 11.452 | 0.21 | 1.00000 | |
| | 4 (DIAPHRAGM) | — | 1.53 | 1.00000 | |
| G3 | 5 | -5.393 | 0.97 | 1.51223 | 56.2 |
| | 6 | -8.770 | 0.46 | 1.00000 | |
| G4 | 7 | 25.548 | 1.21 | 1.51223 | 56.2 |
| | 8 | -3.302 | 0.45 | 1.00000 | |
| G5 | 9 | 96.788 | 1.00 | 1.51223 | 56.2 |
| | 10 | 3.000 | 1.65 | 1.00000 | |
| GC | 11 | ∞ | 0.60 | 1.51872 | 64.0 |
| | 12 | ∞ | 0.40 | 1.00000 | |

FIG. 15

| EXAMPLE 6: ASPHERIC SURFACE DATA | | | |
|---|---|---|---|
| ASPHERICAL COEFFICIENTS | SURFACE LOCATION | | |
| | G3 FRONT SURFACE | G3 REAR SURFACE | G4 FRONT SURFACE |
| K | -1.000183E+01 | -9.999588E+00 | 9.969865E+00 |
| $A_3$ | 4.236750E-03 | 1.373828E-02 | 2.404644E-02 |
| $A_4$ | -3.455528E-02 | -6.217033E-03 | 4.867140E-02 |
| $A_5$ | 2.039217E-02 | -1.477086E-02 | -3.976578E-02 |
| $A_6$ | -1.005499E-02 | 3.172862E-03 | 7.084273E-03 |
| $A_7$ | 4.864285E-04 | 6.673770E-04 | 1.362085E-03 |
| $A_8$ | 2.390637E-03 | 3.051190E-05 | -7.228040E-04 |
| $A_9$ | -8.268186E-04 | 7.872270E-05 | 1.287080E-04 |
| $A_{10}$ | 5.820842E-05 | -3.351679E-05 | -1.288707E-05 |
| | G4 REAR SURFACE | G5 FRONT SURFACE | G5 REAR SURFACE |
| K | -6.943076E+00 | -9.784298E+00 | -6.465375E+00 |
| $A_3$ | 1.032827E-01 | 1.460225E-01 | 5.636915E-02 |
| $A_4$ | -8.754246E-03 | -6.915208E-02 | -2.043811E-02 |
| $A_5$ | -4.280498E-03 | 1.999411E-04 | -1.291779E-02 |
| $A_6$ | -4.043771E-03 | 1.644227E-03 | 6.261449E-03 |
| $A_7$ | 7.113212E-04 | 6.331652E-04 | -1.010210E-04 |
| $A_8$ | 7.386344E-04 | -1.997512E-04 | -4.968879E-04 |
| $A_9$ | -2.623092E-04 | 1.863199E-05 | 1.233722E-04 |
| $A_{10}$ | 2.434939E-05 | -1.164924E-06 | -9.610480E-06 |

FIG. 16

| | EXAMPLE 7: BASE LENS DATA | | | | |
|---|---|---|---|---|---|
| | Si (SURFACE NUMBERS) | Ri (CURVATURES OF RADIUS) | Di (SURFACE SPACE) | nei (REFRACTIVE INDEXES) | vej (ABBE NUMBERS) |
| G1 | 1 | 4.800 | 0.85 | 1.93428 | 18.7 |
| | 2 | 3.317 | 0.03 | 1.00000 | |
| G2 | 3 | 3.312 | 1.94 | 1.75844 | 52.1 |
| | 4 | 12.541 | 0.17 | 1.00000 | |
| | 5 (DIAPHRAGM) | — | 2.01 | 1.00000 | |
| G3 | 6 | -3.532 | 1.12 | 1.51223 | 56.2 |
| | 7 | -6.160 | 0.10 | 1.00000 | |
| G4 | 8 | 10.742 | 1.21 | 1.51223 | 56.2 |
| | 9 | -2.919 | 0.27 | 1.00000 | |
| G5 | 10 | 20.518 | 0.93 | 1.51223 | 56.2 |
| | 11 | 2.322 | 1.50 | 1.00000 | |
| GC | 12 | ∞ | 0.50 | 1.51872 | 64.0 |
| | 13 | ∞ | 0.00 | 1.00000 | |

FIG. 17

| EXAMPLE 7: ASPHERIC SURFACE DATA | | | |
|---|---|---|---|
| ASPHERICAL COEFFICIENTS | SURFACE LOCATION | | |
| | G3 REAR SURFACE | G4 FRONT SURFACE | G4 REAR SURFACE |
| K | -2.434970E+00 | 7.891856E+00 | -1.000000E+01 |
| $A_3$ | -4.349377E-03 | -1.738706E-02 | 5.531069E-02 |
| $A_4$ | -1.236549E-03 | 5.547141E-02 | 1.714501E-02 |
| $A_5$ | -7.944834E-03 | -3.188268E-02 | -6.987505E-03 |
| $A_6$ | 2.973617E-03 | 4.801699E-03 | -4.822374E-03 |
| $A_7$ | -7.280396E-04 | 1.029327E-03 | 7.179287E-04 |
| $A_8$ | -3.814356E-05 | -6.342465E-04 | 7.911117E-04 |
| $A_9$ | 2.461637E-04 | 1.640385E-04 | -2.585722E-04 |
| $A_{10}$ | -5.646417E-05 | -2.079729E-05 | 2.196831E-05 |
| | G5 FRONT SURFACE | G5 REAR SURFACE | |
| K | 9.998663E+00 | -9.843821E+00 | |
| $A_3$ | 1.048580E-01 | 5.944615E-02 | |
| $A_4$ | -4.399362E-02 | -1.946593E-02 | |
| $A_5$ | -3.304228E-03 | -1.277081E-02 | |
| $A_6$ | 1.024671E-03 | 6.286915E-03 | |
| $A_7$ | 6.902054E-04 | -1.625926E-04 | |
| $A_8$ | -1.729071E-04 | -4.943194E-04 | |
| $A_9$ | 2.085670E-05 | 1.273507E-04 | |
| $A_{10}$ | -2.173658E-06 | -1.013228E-05 | |

FIG. 18

| VALUES RELATED TO CONDITIONAL EXPRESSIONS | | | | | | | |
|---|---|---|---|---|---|---|---|
| CONDITIONAL EXPRESSIONS | EXAMPLE 1 | EXAMPLE 2 | EXAMPLE 3 | EXAMPLE 4 | EXAMPLE 5 | EXAMPLE 6 | EXAMPLE 7 |
| (2-1) f12/f | 1.267 | 1.251 | 1.315 | 1.157 | 1.118 | 1.125 | 1.137 |
| (2-2) n1 | 1.934 | 1.934 | 1.855 | 1.855 | 1.704 | 1.934 | 1.934 |
| (2-3) $\nu 2-\nu 1$ | 33.4 | 21.8 | 18.9 | 28.5 | 25.4 | 36.6 | 33.4 |
| (3-1) $\nu 3$ | 55.4 | 56.2 | 56.2 | 56.2 | 56.2 | 56.2 | 56.2 |
| (3-2) $\nu 4$ | 55.4 | 56.2 | 55.4 | 41.8 | 56.2 | 56.2 | 56.2 |
| (3-3) $\nu 5$ | 56.2 | 56.2 | 55.4 | 56.2 | 56.2 | 56.2 | 56.2 |
| (4-1) Lr/Lf | 47.8 | 5.4 | 7.7 | 10.7 | 7.8 | 7.3 | 11.9 |

EXAMPLE 1

EXAMPLE 2

EXAMPLE 3

EXAMPLE 4

EXAMPLE 5

EXAMPLE 6

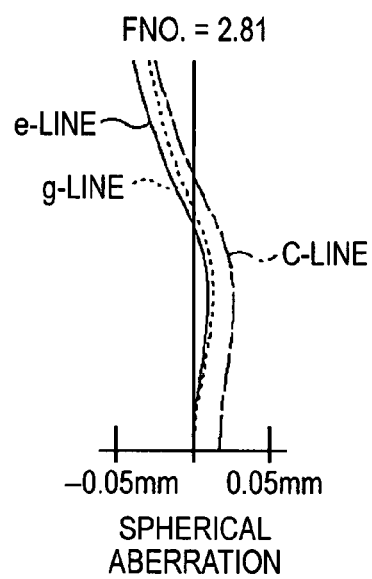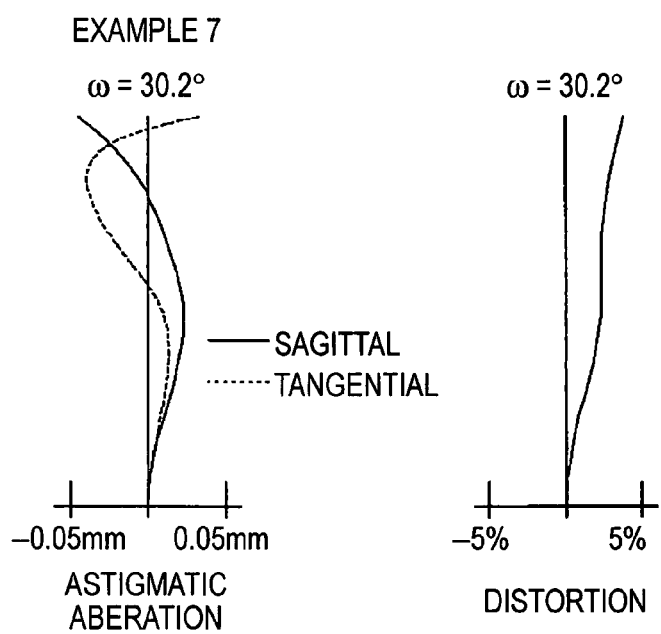
FIG. 25A  FIG. 25B  FIG. 25C

EXAMPLE 1
FIG. 26A TANGENTIAL
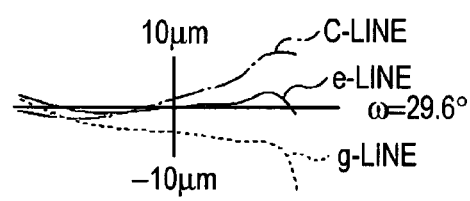
ω=29.6°
FIG. 26F SAGITAL
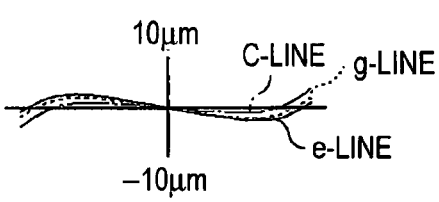
FIG. 26B
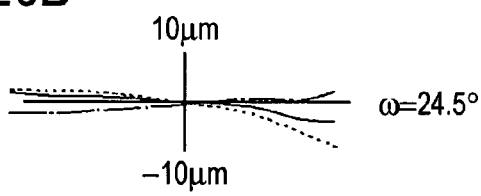
ω=24.5°
FIG. 26G
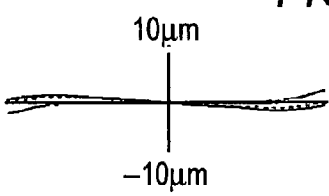
FIG. 26C
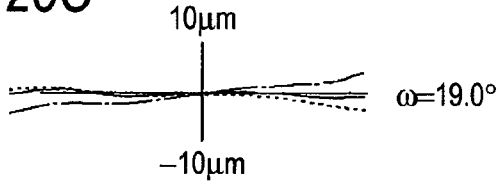
ω=19.0°
FIG. 26H
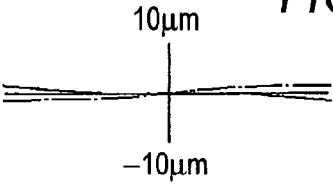
FIG. 26D
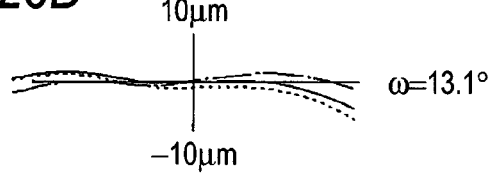
ω=13.1°
FIG. 26I
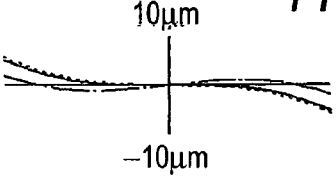
FIG. 26E
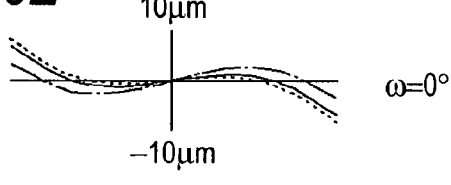
ω=0°

EXAMPLE 2
FIG. 27A TANGENTIAL
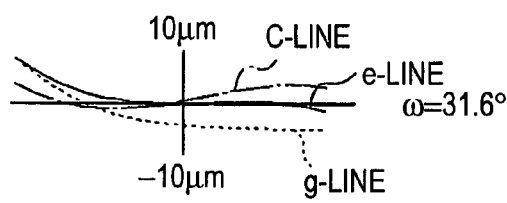
FIG. 27F SAGITAL
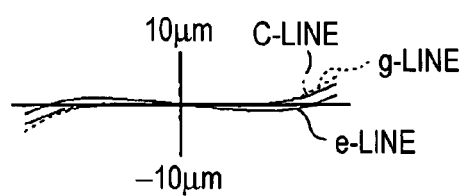
FIG. 27B
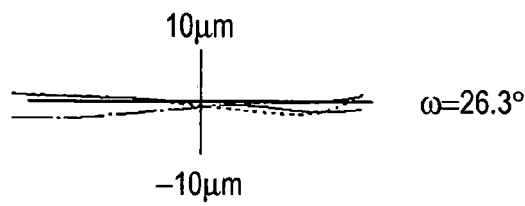
FIG. 27G
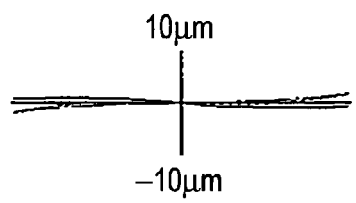
FIG. 27C
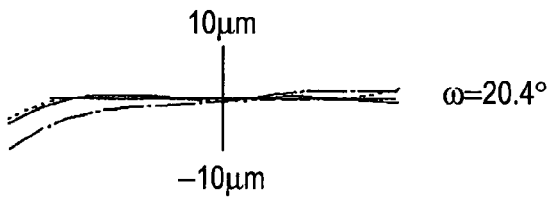
FIG. 27H
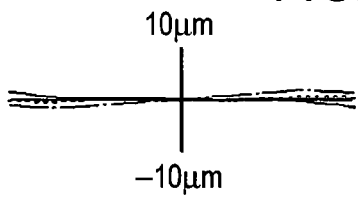
FIG. 27D
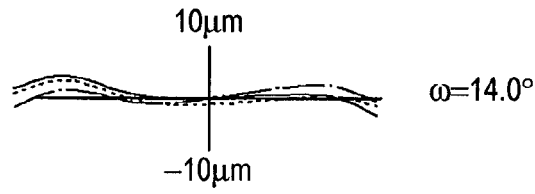
FIG. 27I
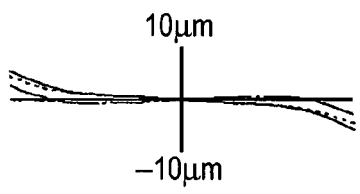
FIG. 27E
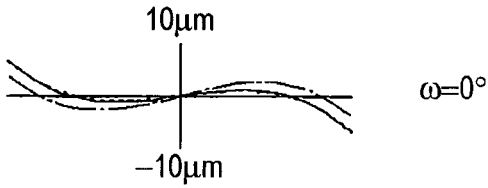

EXAMPLE 3
FIG. 28A TANGENTIAL
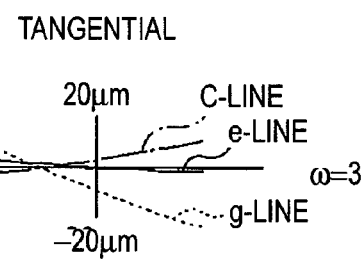
ω=31.7°
FIG. 28F SAGITAL
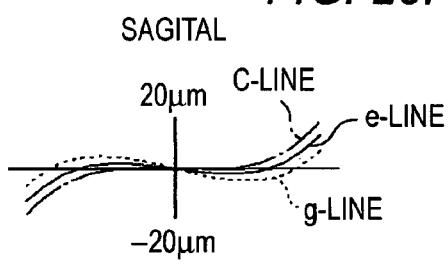
FIG. 28B
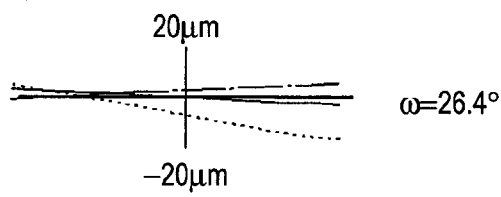
ω=26.4°
FIG. 28G
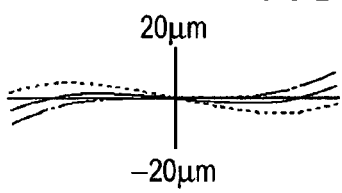
FIG. 28C
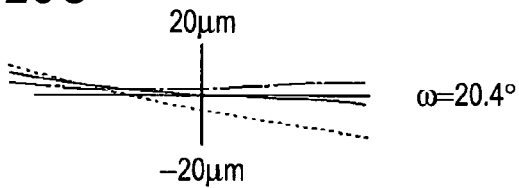
ω=20.4°
FIG. 28H
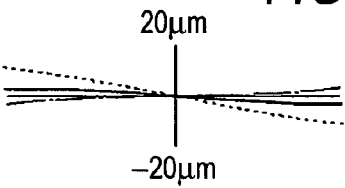
FIG. 28D
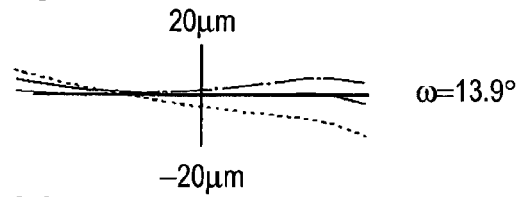
ω=13.9°
FIG. 28I
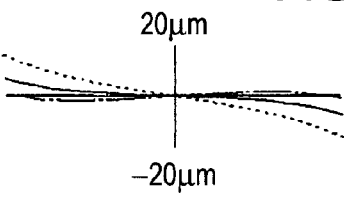
FIG. 28E
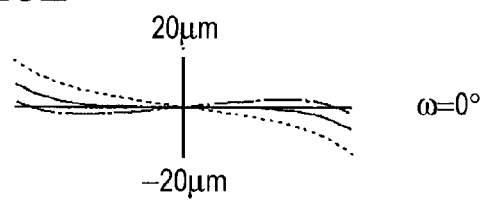
ω=0°

EXAMPLE 4
FIG. 29A TANGENTIAL
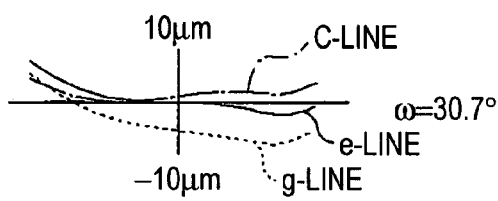
ω=30.7°
FIG. 29B
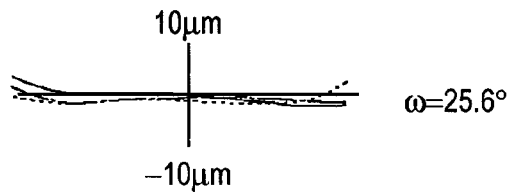
ω=25.6°
FIG. 29C
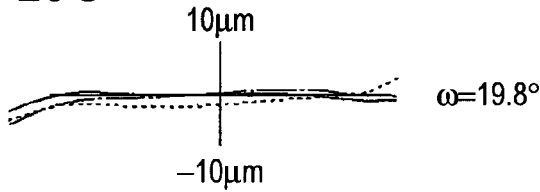
ω=19.8°
FIG. 29D
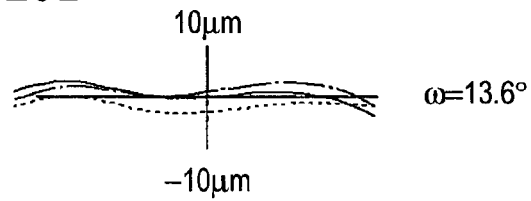
ω=13.6°
FIG. 29E
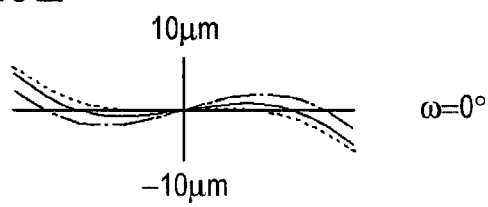
ω=0°
FIG. 29F SAGITAL
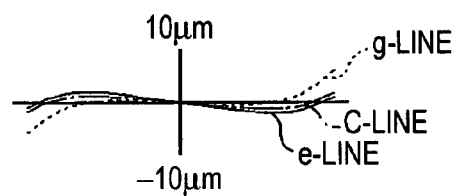
FIG. 29G
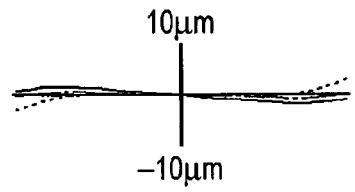
FIG. 29H
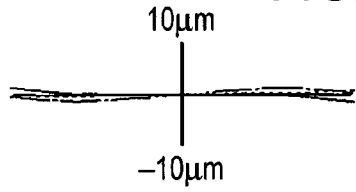
FIG. 29I
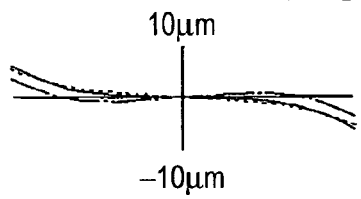

EXAMPLE 5
FIG. 30A TANGENTIAL
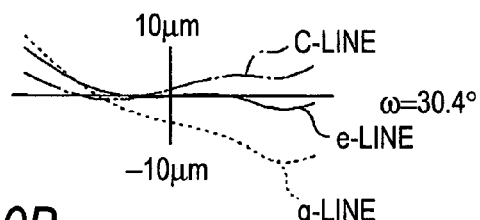
ω=30.4°
FIG. 30F SAGITAL
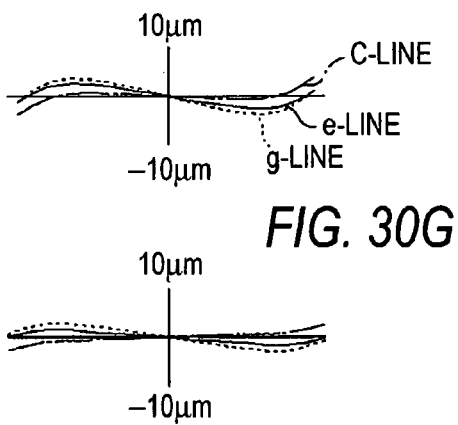
FIG. 30B
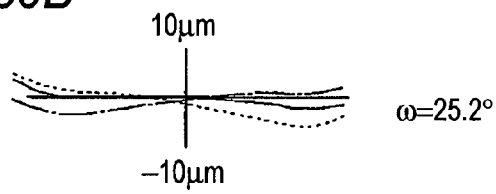
ω=25.2°
FIG. 30G
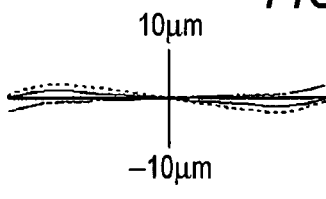
FIG. 30C
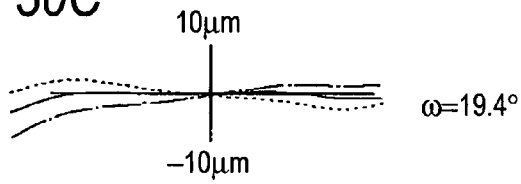
ω=19.4°
FIG. 30H
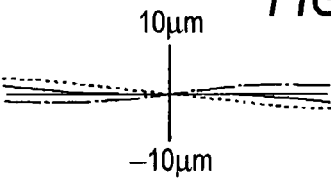
FIG. 30D
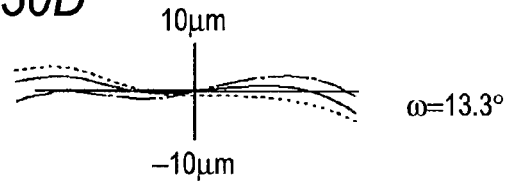
ω=13.3°
FIG. 30I
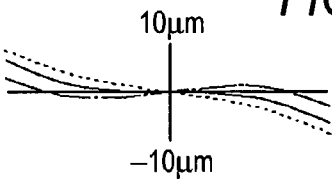
FIG. 30E
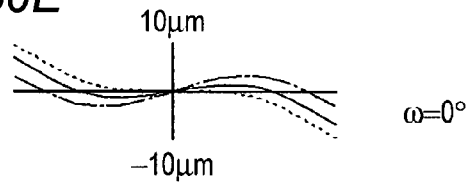
ω=0°

EXAMPLE 6
FIG. 31A TANGENTIAL
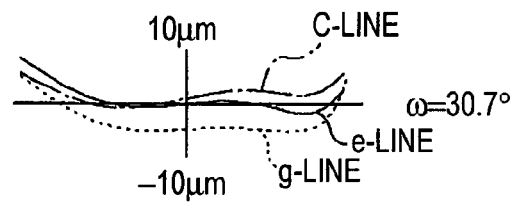 ω=30.7°
FIG. 31F SAGITAL
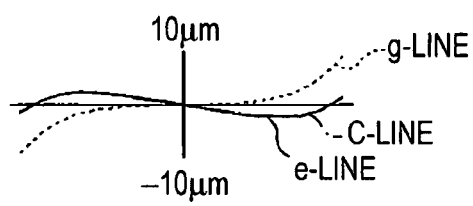
FIG. 31B
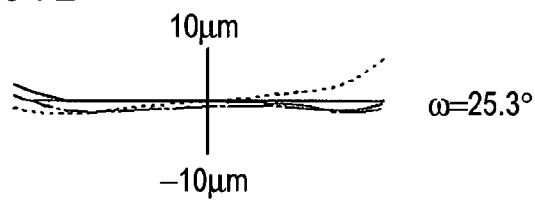 ω=25.3°
FIG. 31G
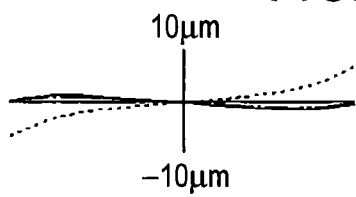
FIG. 31C
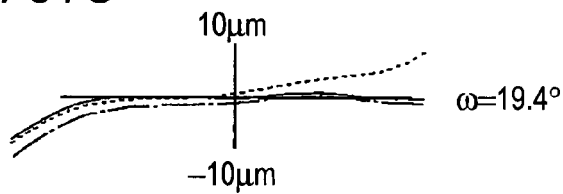 ω=19.4°
FIG. 31H
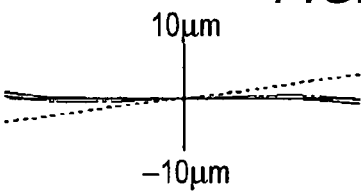
FIG. 31D
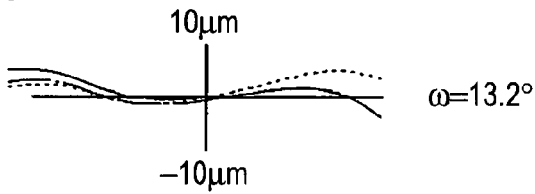 ω=13.2°
FIG. 31I
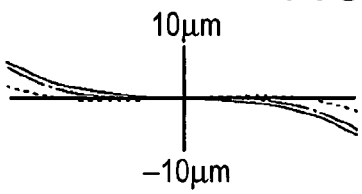
FIG. 31E
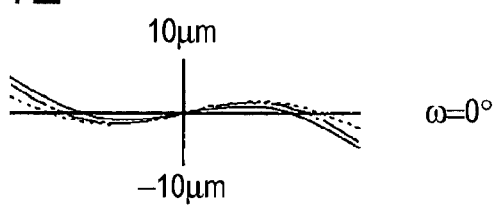 ω=0°

EXAMPLE 7
FIG. 32A TANGENTIAL
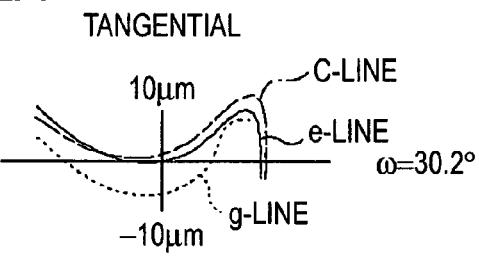
ω=30.2°
FIG. 32F SAGITAL
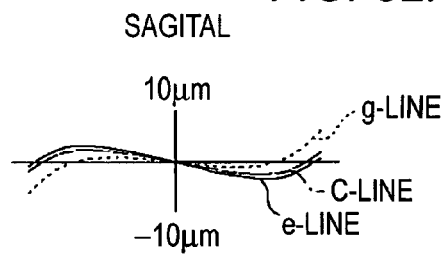
FIG. 32B
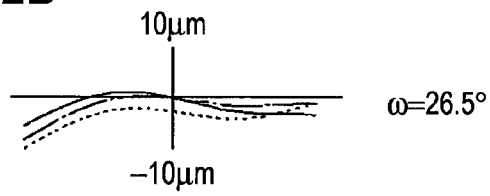
ω=26.5°
FIG. 32G
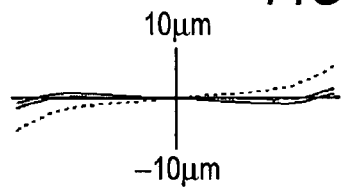
FIG. 32C
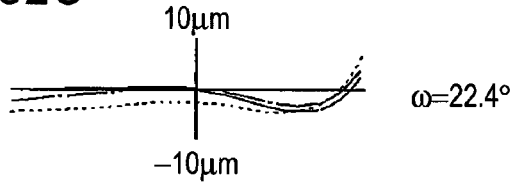
ω=22.4°
FIG. 32H
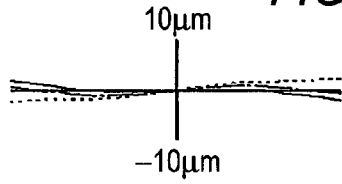
FIG. 32D
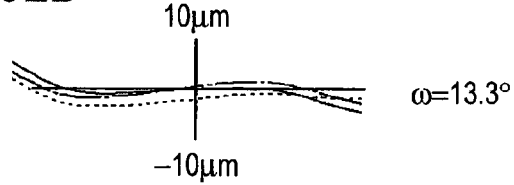
ω=13.3°
FIG. 32I
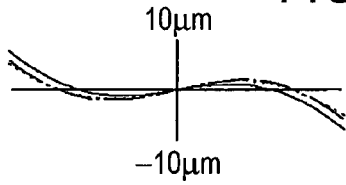
FIG. 32E
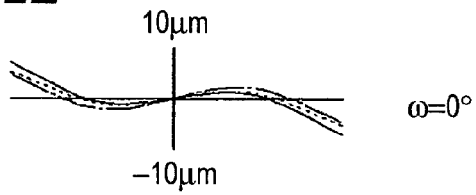
ω=0°

IMAGING LENS AND IMAGING APPARATUS

BACKGROUND OF THE INVENTION

1. Field of the Invention

The present invention relates to an imaging lens which forms an image of a subject on an image pickup device such as a CCD (Charge Coupled Device), a CMOS (Complementary Meal Oxide Semiconductor) and the like. The invention also relates to an imaging apparatus for converting an image of a subject which is formed on the image pickup device into an electric signal so as to obtain a digital image of the subject which is used as a mobile phone with a camera, a portable information terminal (PDA: Personal Digital Assistance), a digital still camera, an on-board camera and a monitoring camera, and an image reader for reading an image such as on a film.

2. Description of the Related Art

In recent years, there has been a demand for smaller lenses in the field of camera lenses which are used in mobile phones with a camera, portable information terminals and the like because of smaller installation spaces, and lenses that are bright and which have high resolving powers have also been in demand because of an upward trend of larger image pickup devices and highly fined pixels. In addition, the same issues are occurring with imaging lenses for digital still cameras and reading lenses for film scanners. To meet these demands, there have been proposed a number of small, bright and highly resolving lenses which are corrected with respect to several aberrations including chromatic aberration. Conventionally, for example, in many cases, imaging lenses which were installed in mobile phones with a camera were made up of three lens elements. However, in order to meet the increase in the number of pixels, there is a tendency that the number of lens elements is increased. JP-A-2004-184987, JP-A-2004-212481, JP-A-2005-4027 and JP-A-2005-31638 describe imaging lenses which are made up of four lens elements.

While image pickup devices are enlarged in size as the resolving power or number of pixels is increased, with any of the imaging lenses described in the aforesaid patent documents which are made up of four lens elements, correction of curvature of image and chromatic difference of magnification is insufficient for installation in an image pickup device which is ½ inch or larger in size, and hence, the imaging lenses described in the patent documents are not suitable for an image pickup device which requires a high resolving power. In addition, in the patent documents, plastic lenses are used in some examples thereof, and polycarbonate is used as a plastic material for the plastic lenses in some examples. With this material used for plastic lenses, since a double refraction is easy to occur at the time of molding, optical path lengths of light rays which pass through a lens made from polycarbonate are desirably made as short as possible, and hence, when a polycarbonate plastic lens is used for a lens which requires a high resolving power, for example, a thickness of the lens at the center thereof needs to be restricted, this decreasing the degree of freedom in design. Consequently, such poly carbonate plastic lenses are said to be unsuitable for use as a lens requiring a high resolving power.

SUMMARY OF THE INVENTION

The invention was made in view of the problems inherent in the related art, and an object thereof is to provide an imaging lens which is made to realize a high-performance lens system which is corrected properly with respect to several aberrations so as to deal with larger image pickup devices and highly fined pixels which result from the increase in resolving power, and an imaging apparatus which incorporates therein the imaging lens so as to obtain a highly resolved imaging image.

According to the invention, there is provided an imaging lens comprising, in order arranged from an object side: a first lens having a negative meniscus shape with a convex face directed to the object side thereof; a second lens having a positive shape with a convex face directed to the object side thereof; a diaphragm; a third lens with a convex face directed to an image; a fourth lens having a positive refractive power near an optical axis; and a fifth lens with a concave face directed to the image near the optical axis while with a convex face directed to the image towards its periphery on an image side surface thereof.

In addition, according to the invention, there is provided an imaging apparatus comprising the imaging lens according to the invention and an image pickup device that outputs an electric signal according to an image of a subject which is formed by the imaging lens.

With the imaging lens according to the invention, as a whole, the five-lens configuration is adopted which is made up of the first to fifth lenses, so that the number of lenses is increased compared to the conventional imaging lenses which are made up of four lenses and the optimum configuration is realized for each of the constituent lens elements, whereby the resulting imaging lens becomes advantageous in correction of the several aberrations and can deal with the trend of larger image pickup devices and highly fined pixels. By adopting this configuration, a high-performance lens system can be obtained. In particular, an achromatism effect can be obtained by adopting the combination of the positive lens and the negative lens for the first lens and the second lens. On the other hand, in the third lens to the fifth lens, light rays are divided based on image heights, so that correction is implemented for each image height, whereby in the third lens to the fifth lens, correction of curvature of image and distortion is implemented properly while correcting a large negative spherical aberration which has occurred in the first lens and the second lens. A more effective aberration correction becomes possible by using aspherical surfaces for the third lens to the fifth lens. In particular, since the fifth lens is curved to be concave towards the image side in the vicinity of the optical axis while being curved to convex towards the image side along the circumferential edge portion on the image side surface thereof, the aberration correction for each image height is implemented properly, and incident angles of light rays incident on the image pickup device are controlled to be less than or equal to a certain determined angle, whereby irregularity in quantity of light over the whole area of an image forming plane is reduced.

In addition, with the imaging apparatus according to the invention, an image of a subject formed by the high-performance imaging lens of the invention is formed on the image pickup device, so as to be converted into an electric signal, whereby a highly resolved imaging image can be obtained.

Furthermore, with the imaging lens according to the invention, by properly adopting the following preferred conditions according to required specifications or the like, a more improved optical performance can be provided.

The imaging lens according to the invention preferably satisfies the following conditional expressions. In the expressions, f denotes a focal length of a whole lens system, $f_{12}$ a composite focal length of the first lens and the second lens, $n_1$ a refractive index of the first lens at the e-line, $v_1$ the Abbe number of the first lens at the e-line, and $v_2$ the Abbe number of the second lens.

$$1.05 < f_{12}/f < 1.35 \quad (2\text{-}1)$$

$$1.68 < n_1 \quad (2\text{-}2)$$

$$17 < v_2 - v_1 < 40 \quad (2\text{-}3)$$

In addition, in the imaging lens according to the invention, at least two lenses of the third lens, the fourth lens and the fifth lens are preferably plastic lenses, at least one side of the third lens, the fourth lens and the fifth lens is preferably of an aspherical surface, and furthermore, the following conditional expressions are preferably satisfied. In the expressions, $v_3$ denotes the Abbe number of the third lens at the e-line, $v_4$ the Abbe number of the fourth lens at the e-line, and $v_5$ the Abbe number of the fifth lens at the e-line.

$$40 < v_3 \quad (3\text{-}1)$$

$$40 < v_4 \quad (3\text{-}2)$$

$$40 < v_5 \quad (3\text{-}3)$$

Note that a material is desirably used for the plastic lens which produces as little double refraction as possible at the time of molding, and it is desirable to use an amorphous resin like, for example, ZEONEX produced and marketed by Japan ZEON Co., Ltd.

In addition, in the imaging lens according to the invention, letting a space between the second lens and the diaphragm be $L_F$ and a space between the diaphragm and the third lens be $L_R$, the following conditional expression is preferably satisfied;

$$5.0 < L_R/L_F < 55 \quad (4\text{-}1).$$

Additionally, in the imaging lens according to the invention, the first lens and the second lens may be compounded as a cemented lens.

In addition, in the imaging lens according to the invention, the first lens and the second lens may be are glass lenses. By forming the first lens and the second lens into the glass lenses, a highly refractive material can be used, and since there is provided a degree of freedom in selecting Abbe numbers, in particular, correction of chromatic aberration and curvature of image can be implemented properly.

Additionally, in the imaging lens according to the invention, a shutter mechanism is provided between the second lens and the third lens.

BRIEF DESCRIPTION OF THE DRAWINGS

FIG. 5 is a diagram showing a lens data related to an aspheric surface of the imaging lens according to Example 1;

FIG. 6 is a diagram showing a basic lens data of the imaging lens according to Example 2;

FIG. 7 is a diagram showing a lens data related to an aspheric surface of the imaging lens according to Example 2;

FIG. 8 is a diagram showing a basic lens data of the imaging lens according to Example 3;

FIG. 9 is a diagram showing a lens data related to an aspheric surface of the imaging lens according to Example 3;

FIG. 10 is a diagram showing a basic lens data of the imaging lens according to Example 4;

FIG. 11 is a diagram showing a lens data related to an aspheric surface of the imaging lens according to Example 4;

FIG. 12 is a diagram showing a basic lens data of the imaging lens according to Example 5;

FIG. 13 is a diagram showing a lens data related to an aspheric surface of the imaging lens according to Example 5;

FIG. 14 is a diagram showing a basic lens data of the imaging lens according to Example 6;

FIG. 15 is a diagram showing a lens data related to an aspheric surface of the imaging lens according to Example 6;

FIG. 16 is a diagram showing a basic lens data of the imaging lens according to Example 7;

FIG. 17 is a diagram showing a lens data related to an aspheric surface of the imaging lens according to Example 7;

FIG. 18 is a diagram showing values related to conditional expressions for individual examples altogether;

FIGS. 19A to 19C are aberration diagrams showing aberrations of the imaging lens according to Example 1, in which FIG. 19A shows a spherical aberration, FIG. 19B shows an astigmatic aberration, and FIG. 19C shows a distortion;

FIGS. 20A to 20C are aberration diagrams showing aberrations of the imaging lens according to Example 2, in which FIG. 20A shows a spherical aberration, FIG. 20B shows an astigmatic aberration, and FIG. 20C shows a distortion;

FIGS. 21A to 21C are aberration diagrams showing aberrations of the imaging lens according to Example 3, in which FIG. 21A shows a spherical aberration, FIG. 21B shows an astigmatic aberration, and FIG. 21C shows a distortion;

FIGS. 22A to 22C are aberration diagrams showing aberrations of the imaging lens according to Example 4, in which FIG. 22A shows a spherical aberration, FIG. 22B shows an astigmatic aberration, and FIG. 22C shows a distortion;

FIGS. 23A to 23C are aberration diagrams showing aberrations of the imaging lens according to Example 5, in which FIG. 23A shows a spherical aberration, FIG. 23B shows an astigmatic aberration, and FIG. 23C shows a distortion.

FIGS. 24A to 24C are aberration diagrams showing aberrations of the imaging lens according to Example 6, in which FIG. 24A shows a spherical aberration, FIG. 24B shows an astigmatic aberration, and FIG. 24C shows a distortion;

FIGS. 25A to 25C are aberration diagrams showing aberrations of the imaging lens according to Example 7, in which FIG. 25A shows a spherical aberration, FIG. 25B shows an astigmatic aberration, and FIG. 25C shows a distortion;

FIGS. 26A to 26I are aberration diagrams showing lateral aberrations of the imaging lens according to Example 1;

FIGS. 27A to 27I are aberration diagrams showing lateral aberrations of the imaging lens according to Example 2;

FIGS. 28A to 28I are aberration diagrams showing lateral aberrations of the imaging lens according to Example 3;

FIGS. 29A to 29I are aberration diagrams showing lateral aberrations of the imaging lens according to Example 4;

FIGS. 30A to 30I are aberration diagrams showing lateral aberrations of the imaging lens according to Example 5;

FIGS. 31A to 31I are aberration diagrams showing lateral aberrations of the imaging lens according to Example 6; and FIGS. 32A to 32I are aberration diagrams showing lateral aberrations of the imaging lens according to Example 7.

DETAILED DESCRIPTION OF THE INVENTION

Hereinafter, an embodiment of the invention will be described in detail by reference to the drawings.

Figure 1:
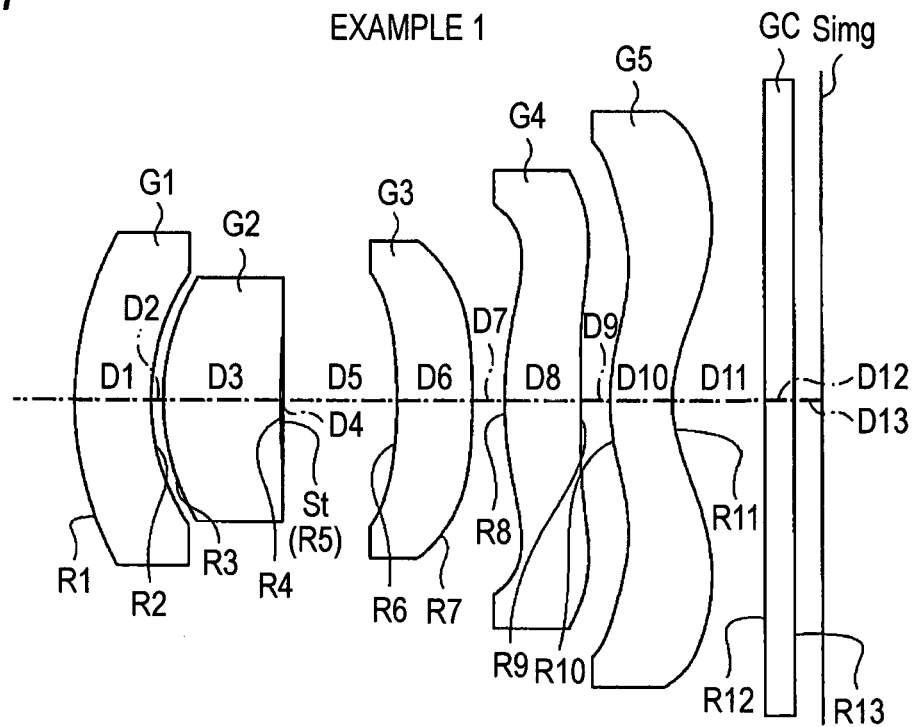
FIG. 1 is a sectional view of lenses of an imaging lens according to Example 1 of the invention.
Figure 2:
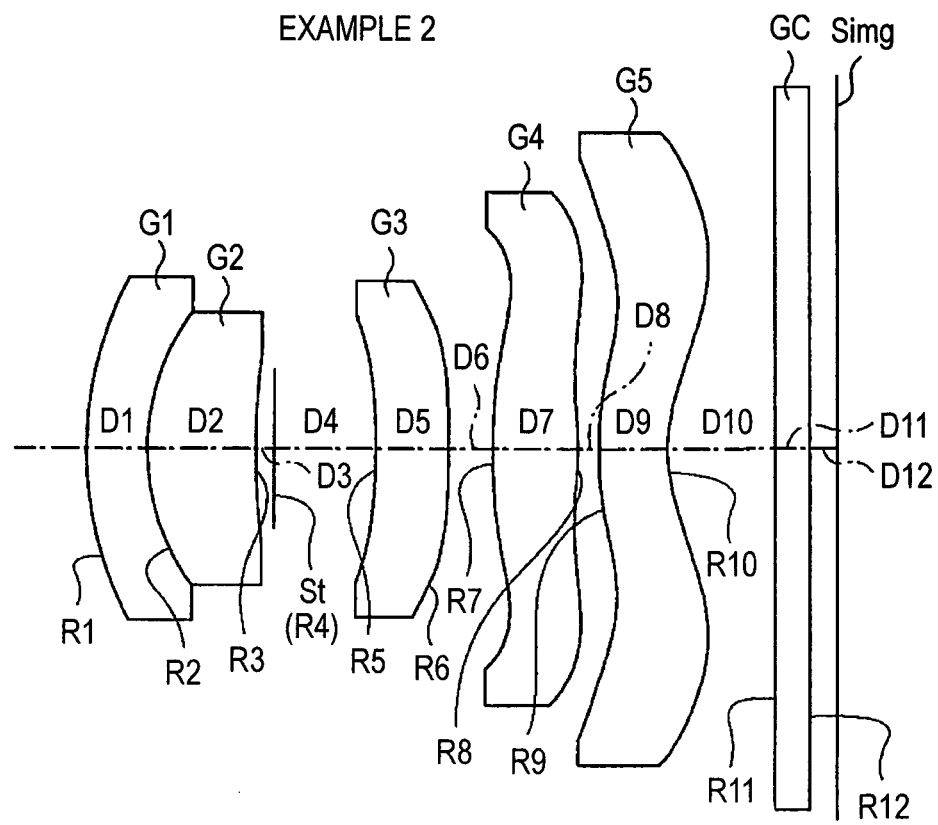
FIG. 2 is a sectional view of lenses of an imaging lens according to Example 2 of the invention.
Figures 3, 4:
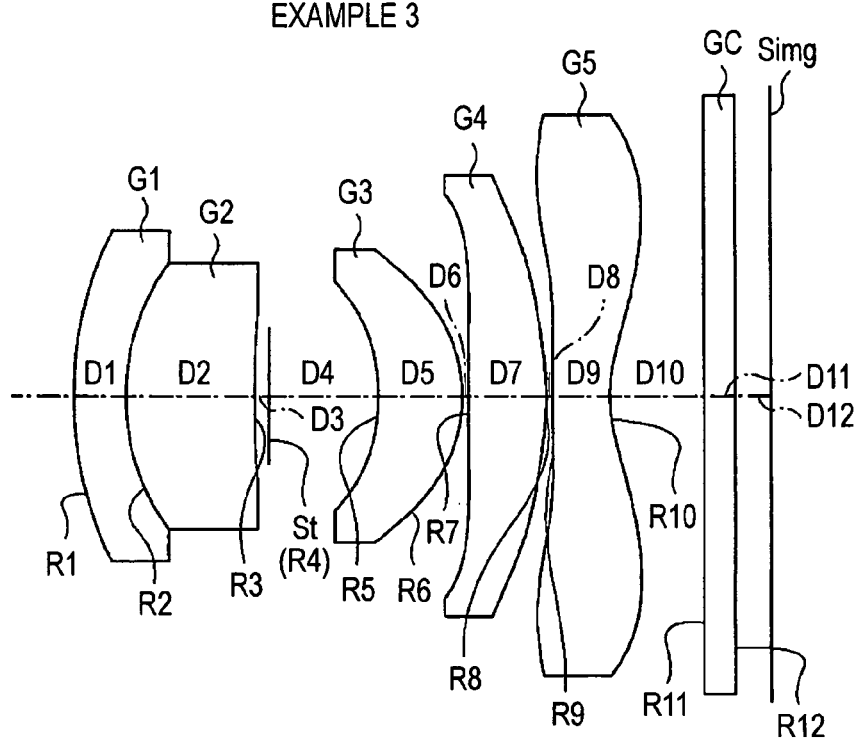
FIG. 3 is a sectional view of lenses of an imaging lens according to Example 3 of the invention.
FIG. 4 is a diagram showing a basic lens data of the imaging lens according to Example 1.

FIG. 1 is a first configuration example of an imaging lens according to an embodiment of the invention. This configuration example corresponds to a lens configuration of a first numerical example (FIGS. 4, 5) which will be described later on. FIG. 2 shows a second configuration example. This configuration example corresponds to a second numerical example (FIGS. 6, 7) which will be described later on. FIG. 3 shows a third configuration example. This configuration example corresponds to a third numerical example (FIGS. 8, 9) which will be described later on. In FIGS. 1 to 3, a reference character Ri denotes a radius of curvature of an ith surface when reference characters are imparted in an ascending order from an object side to an image side (a formed image side) of the imaging lens with a first reference character imparted to a surface of a constituent lens element which lies in an outermost position on the object side of the imaging lens. A reference character Di denotes a surface space on an optical axis Z1 between the ith surface and an i+1th surface. Note that since the basic configurations of the individual configuration examples are the same, in the following description, a description will be made based on the first configuration example.

This imaging lens is such as to be preferably used in various types of imaging apparatuses utilizing an image pickup device such as a CCD or a CMOS which includes, for example, mobile phones with a camera, portable information terminals, digital still cameras and digital video cameras, onboard cameras, monitoring cameras and the like. Additionally, the imaging lens can be used as an image reading lens which reads images on a film. This imaging lens includes a first lens G1, a second lens G2, an optical aperture stop St, a third lens G3, a fourth lens G4 and a fifth lens along the optical axis Z1 sequentially in that order from the object side thereof.

An image pickup device such as a CCD or the like, which is not shown, is disposed on an image forming plane Simg. In an imaging apparatus such as a digital still camera in which this imaging lens is installed, an image of a subject is converted into an electric signal by the image pickup device, and the resulting electric signal is processed variously so as to obtain a digital image. Various types of optical members GC are disposed between the fifth lens G5 and the image pickup device according to the configuration of the apparatus to which the imaging lens is attached. For example, a flat plate-shaped optical member such as an imaging surface protecting glass cover, an infrared radiation cut-off filter and the like.

The first lens G1 has a negative meniscus shape with a convex face directed to the object side thereof. The second lens G2 has a positive shape with a convex face directed to the object side thereof. The second lens G2 can be made up of, for example, a positive meniscus lens which has a convex face directed to the object side. The first lens G1 and the second lens G2 are preferably glass lenses. In addition, while surfaces of the first lens G1 and the second lens G2 are desirably spherical from the viewpoint of production costs, in order to obtain a higher lens performance, one surface or more may be aspherical.

The first lens G1 and the second lens G2 may be a cemented lens as shown in the second configuration example shown in FIG. 2 and the third configuration example shown in FIG. 3. The first lens G1 and the second lens G2 are preferably compounded together to constitute a cemented lens so as to ease adjustment because a decentering eccentricity error can be eliminated by such a combination or cemented lens.

The third lens G3, fourth lens G4 and fifth lens G5 are preferably such as to have aspherical surfaces. The third lens G3 has a convex face directed to the image. The third lens G3 can be made up of, for example, a positive or negative meniscus lens which have on its image side a convex surface directed to the image. An object side surface of the fourth lens G4 preferably has a convex face near the optical axis while having a concave face towards the periphery thereof. An image side surface of the fourth lens G4 preferably has, for example, a convex face near the optical axis. The fifth lens G5 has a concave face directed to the image near the optical axis while having a convex face directed to the image towards its periphery on an image side surface thereof. An object side surface of the fifth lens G5, for example, preferably has a convex face near the optical axis.

The imaging lens preferably satisfies the following conditional expression, in which f denotes a focal length of a whole lens system, $f_{1,2}$ a composite focal length of the first lens and the second lens, $n_1$ a refractive index of the first lens at the e-line, $v_1$ the Abbe number of the first lens G1 at the e-line, and $v_2$ the Abbe number of the second lens G2 at the e-line.

$$1.05 < f_{1,2}/f < 1.35 \tag{2-1}$$

$$1.68 < n_1 \tag{2-2}$$

$$17 < v_2 - v_1 < 40 \tag{2-3}$$

In addition, in the imaging lens, at least two lenses of the third lens G3, the fourth lens G4 and the fifth lens G5 are preferably plastic lenses. In particular, from the viewpoint of molding, a plastic lens is preferably used for an aspherical lens. In addition, a material is desirably used for the plastic lens which produces as little double refraction as possible at the time of molding, and it is desirable to use an amorphous resin like, for example, ZEONEX produced and marketed by Japan ZEON Co., Ltd. The imaging lens also preferably satisfies the following conditional expressions, in which $v_3$ denotes the Abbe number of the third lens G3 at the e-line, $v_4$ the Abbe number of the fourth lens G4 at the e-line, and $v_5$ the Abbe number of the fifth lens G5 at the e-line.

$$40 < v_3 \tag{3-1}$$

$$40 < v_4 \tag{3-2}$$

$$40 < v_5 \tag{3-3}$$

When letting a space between the second lens G2 and the diaphragm St be $L_F$ and a space between the diaphragm St and the third lens G3 be $L_R$, the imaging lens also preferably satisfies the following conditional expression;

$$5.0 < L_R/L_F < 55 \tag{4-1}.$$

Additionally, in the imaging lens, a shutter mechanism may be provided between the second lens and the third lens. With a highly resolving lens, a mechanical shutter mechanism is desirably provided from the viewpoint of preventing the blurring and smearing of an image which are produced from a transmission time for a large volume of image information. Furthermore, the shutter mechanism is desirably provided in a position which lies in the vicinity of an iris where light rays of individual image heights are almost superposed, that is, in the vicinity of the stop St from the viewpoint of the irregularity in quantity of light. By adopting this configuration, since a variation in quantity of light by the operation of the shutter mechanism becomes almost the same at the individual image heights, the irregularity in quantity of light can be reduced, this obviating the necessity of providing a separate correction mechanism or processing system.

In addition to the optical stop St which determines brightness, a halo or flare stop may be disposed which interrupts flare light which is not involved in the formation of an image in order to interrupt unnecessary light producing a ghost image or flare. The flare stop may be disposed in any position such as in front of the first lens G1, between the first lens G1 and the second lens G2, between the second lens G2 and the stop St, between the stop St and the third lens G3, between the third lens G3 and the fourth lens G4, between the fourth lens G4 and the fifth lens G5, and between the fifth lens and the image pickup device, and furthermore, the flare stop may be disposed in a plurality of positions. In addition, part of a lens barrel such as a spacer ring or a presser ring may double as the flare stop, or the flare stop may be provided by applying printing directly on an optical surface or painting the same.

Next, the function and advantage of the imaging lens that is configured as has been described above will be described.

In this imaging lens, as a whole, the five-lens configuration is adopted which is made up of the first to fifth lenses G1 to G5, so that the number of lenses is increased compared to the conventional imaging lenses which are made up of four lenses and the optimum configuration is realized for each of the constituent lens elements, whereby the resulting imaging lens becomes advantageous in correction of the several aberrations such as chromatic aberration, curvature of image and distortion and a bright and highly resolving lens system can be obtained. In particular, an achromatism effect can be provided by adopting the combination of the positive lens and the negative lens for the first lens G1 and the second lens G2. In this case, by making up the first lens G1 and the second lens G2 of glass lenses, a highly refractive material can be used, and since such a material can provide a degree of freedom in selection of Abbe numbers, the correction of, in particular, chromatic aberration and curvature of image can be implemented properly.

On the other hand, in the third lens G3 to the fifth lens G5, light rays are divided based on image heights, so that correction is implemented for each image height. In the third lens G3 to the fifth lens G5, since light rays are divided based on individual image heights, the correction of curvature of image and distortion can be implemented properly while correcting a large negative spherical aberration which has occurred in the first lens G1 and the second lens G2. Here, a more effective aberration correction becomes possible by using aspherical surfaces for the surfaces of the third lens G3 to the fifth lens G5. In order to deal with an image pickup device of a large number of pixels, a telecentric property or a property is required in which the incident angle of a principal ray of light which is incident on the image pickup device becomes nearly parallel to the optical axis (the incident angle on the imaging plane becomes close to zero relative to the normal of the imaging plane). In this imaging lens, the image side surface of the fifth lens G5, which constitutes a final lens surface of the imaging lens, is formed into a shape in which the surface is curved to be concave towards the image in the vicinity of the optical axis while being curved to be convex towards the image along the circumferential edge thereof, and therefore, the aberration correction for each image height is implemented properly, and the incident angles of light rays which are incident on the image pickup device are controlled to be less than or equal to a certain determined angle, thereby making it possible to reduce the irregularity in quantity of light over the whole area of the image forming plane.

The three conditional expressions (2-1), (2-2), (2-3) are specific conditional expressions for properly correcting spherical aberration, chromatic aberration and curvature of image. The conditional expression (2-1) is such as to regulate the refractive powers of the first lens G1 and the second lens G2, and by maintaining a ratio of the composite focal length $f_{12}$ of the first lens G1 and the second lens G2 and the focal length f of the whole lens system within a certain determined range, a proper correction of chromatic aberration is enabled. In the event that the composite focal length $f_{12}$ of the first lens G1 and the second lens G2 approaches the focal length f of the whole lens system across a lower limit of the conditional expression (2-1), the refractive index of one or both of the first lens G1 and the second lens G2 is decreased. In the event that the refractive index of the first lens G1 is decreased, the Abbe number thereof is increased in conjunction with the decrease in the refractive index, whereby a strong refractive power becomes necessary in order to correct chromatic aberration. A strong refractive power also becomes necessary for the second lens G2 to suppress an aberration of a high order which is produced by the increased refractive power of the first lens G1, whereby since a negative spherical aberration becomes too large, the load of correcting chromatic aberration becomes large from the third lens G3 to the fifth lens G5, and the degree of freedom in correcting an aberration such as curvature of image which occurs off the optical axis is decreased, a high performance being not thereby expected over the whole of an image forming area. In addition, the curvatures of the surfaces of the first lens G1 and the second lens G2 which face each other are also decreased, and this deteriorates the workability. Also, in the event that the refractive index of the second lens G2 is decreased, since the proper refractive power that is required for the composite system of the first lens G1 and the second lens G2 is determined, the same problem is caused as that caused when the refractive power of the second lens G2 becomes strong and the refractive index of the first lens G1 is decreased. On the other hand, in the event that the composite focal length $f_{12}$ of the first lens G1 and the second lens G2 increases across an upper limit of the conditional expression (2-1), since the refractive indexes of the individual lenses are increased so as to increase their curvatures of radius, while the workability can be improved, since a difference in Abbe number between the lenses becomes small, the correction of chromatic aberration becomes insufficient, and hence, a high performance cannot be expected, either.

The conditional expressions (2-2) and (2-3) are conditional expressions which enable a proper correction of chromatic aberration, and materials are desirably selected within a range which satisfies both the expressions. When the refractive index of the first lens G1 is decreased across a lower limit of the conditional expression (2-2), in order to implement a proper correction of chromatic aberration, a proper value shown in the expression (2-3) needs to be imparted to the Abbe numbers of the first lens G1 and the second lens G2, and therefore, the refractive index of the second lens G2 is also decreased. Because of this, a strong refractive power needs to be imparted to each lens, and aberrations such as spherical aberration and curvature of image which occur off the optical axis are produced so largely that the correction thereof by the following lenses becomes difficult to be implemented properly. In the event that the difference in Abbe number between the second lens G2 and the first lens G1 is decreased across a lower limit of the conditional expression (2-3), the difference in Abbe number is eliminated, and the effect of chromatic aberration correction is, in turn, eliminated. On the contrary, the difference in Abbe number is increased across an upper limit of the conditional expression (2-3), a difference in refractive index between the first lens G1 and the second lens G2 becomes large or the refractive indexes of both the lenses become too small. In the case of the former, since the refractive power of the second lens G2 increases in proportion to the refractive index of the first lens G1, astigmatic aberration and a curvature of image which are produced here are enhanced to such an extent that the correction thereof becomes difficult. In the case of the latter, as has been described before, the realization of a high resolution over the whole of the image forming plane becomes difficult in any case.

Note that while there is no specific limitation imposed on an upper limit of the refractive index $n_1$ of the first lens G1, provided that a material for the second lens G2 is found within a range which satisfies the expression (2-3), in consideration of production costs, transmissivity on a short wavelength side and workability, it becomes realistic that the refractive index of the first lens G1 is desirably $$n_1 < 2.0 \quad (2\text{-}4)$$

Making up the respective surfaces of the third lens G3, the fourth lens G4 and the fifth lens G5 of aspherical surfaces provide a degree of freedom in correction of chromatic aberration. In this case, a plastic molded lens has a larger degree of freedom with respect to molding shapes than a glass molded lens and is more advantageous in implementation of a chromatic aberration correction. By adopting such a plastic lens for the third to fifth lenses, the large negative spherical aberration and the curvature of image and distortion relative to the individual image heights which are generated in the first lens G1 and the second lens G2 can be corrected properly, and furthermore, the shape of the fifth lens G5 can easily be determined in such a way as to control the incident angles of light rays which are incident on the image pickup device to be a proper value. The three conditional expressions (3-1), (3-2), (3-3) denote conditions to suppress the increase in chromatic aberration in the third lens G3, the fourth lens G4 and the fifth lens G5, and in the event that the Abbe numbers of the lenses exceed ranges defined by these expressions, residual chromatic aberrations become remarkable in the respective lenses. In this imaging lens, since chromatic aberration is basically corrected in the first lens G1 and the second lens G2, the Abbe numbers of the third lens G3 to the fifth lens G5 are preferably made to take large values so as to suppress the generation of chromatic aberration due to dispersion.

The conditional expression (4-1) is a conditional expression which allows light rays lying on and off the optical axis to be separated from each other in a substantially good condition so as to enable an independent chromatic aberration to occur in the individual light rays. The condition exceeds a lower limit of the conditional expression (4-1), since a ratio of dividing the individual light rays is decreased, the degree of freedom in independently correcting the aberration for each image height is reduced, and a correction of aberration to provide a high resolution becomes difficult. On the contrary, the condition exceeds an upper limit, an enlargement of the lens system has to be called for, which is not preferred.

As has been described heretofore, according to the imaging lens according to the embodiment of the invention, since the optimum configurations of the individual lenses are realized by making up the imaging lens of the five lenses, a high-performance lens system can be realized which is corrected properly with respect to the several aberrations so as to deal with larger image pickup devices and highly fined pixels which result from the increase in resolving power. In addition, according to the imaging apparatus according to the embodiment of the invention, since an image of a subject which is formed by the high-performance lens according to the embodiment is formed on the image pickup device so as to obtain an image, a highly resolved imaging image can be obtained.

EXAMPLES

Next, specific numerical examples of the imaging lens according to the example of the invention will be described. First to seventh numerical examples will be described altogether below.

A specific lens data which corresponds to the configuration of the imaging lens shown in FIG. 1 is shown as Example 1 in FIGS. 4, 5. More particularly, a basic lens data is shown FIG. 4, while a data on the aspherical surfaces is shown in FIG. 5. In a column of surface numbers Si of the lens data shown in FIG. 4, the numbers of ith surfaces (i=1 to 13) are shown to which reference numerals are imparted in an ascending order sequentially-from the object side to the image side of the imaging lens with a numeral 1 imparted to a surface of the constituent lens element which lies in an outermost position on the object side of the imaging lens. In a column of curvatures of radius Ri, the values (mm) of curvatures of radius of the ith surfaces from the object side are shown with reference characters Ri imparted respectively. Also, in a column of surface spaces Di, spaces (mm) on the optical axis between the ith surfaces Si and i+1th surfaces Si+1 are shown. An Nei column shows values of refractive indexes relative to e-lines (wavelength is 546.07 nm) between the adjacent lens surfaces. A vej column shows values of Abbe numbers relative to the e-line of jth (j=1 to 6) optical elements. The Abbe number is to be expressed by the following expression.

$$ve = (Ne-1)/(NF'-NC')$$

where, NF' denotes a refractive index relative to an F'-line (wavelength is 479.99 nm), and NC' the value of a refractive index relative to a C'-line (wavelength is 643.85 nm).

In an imaging lens according to Example 1, both surfaces of each of a third lens G3, a fourth lens G4 and a fifth lens G5 are formed into an aspherical shape. In the basic lens data shown in FIG. 4, as curvatures of radius of these aspherical surfaces, values of curvatures of radius in the vicinity of the optical axis are shown. In the numerical values shown in FIG. 5 as the aspherical surface data, a symbol "E" indicates that a numerical value that follows it is a power exponent based on 10 and that a numerical value expressed by a power function based on 10 is multiplied by a numerical value present before the symbol "E." For example, "1.0E−02," denotes "$1.0 \times 10^{-2}$".

As the aspherical surface data, values of individual coefficients $A_n$, K in the expression of an aspherical shape which is expressed by the following expression (A) are written. Z denotes the length (mm) of a perpendicular which is drawn down to a tangent plane (a plane perpendicular to the optical axis Z1) to an apex of the aspherical surface. In the imaging lens according to Example 1, the individual aspherical surfaces are expressed effectively as aspherical coefficients $A_n$ using coefficients $A_3$ to $A_{10}$ of third to tenth orders.

$$Z = C \times Y^2 / \{1 + (1 - K \times C^2 \times Y^2)^{1/2}\} + \Sigma A_n \times Y^n \quad (A)$$

(n=an integer of 3 or more)

where, Z: depth (mm) of aspherical surface

Y: distance (height) (mm) from optical axis to lens surface

K: eccentricity (aspherical surface coefficient of second order)

C: paraxial curvature=1/R (R: paraxial curvature of radius)

$A_n$: aspherical coefficient of an nth order

A specific lens data which corresponds to the configuration of the imaging lens shown in FIG. 2 is shown in FIGS. 6, 7 as Example 2 in a similar fashion to the imaging lens according to Example 1. Similarly, a specific lens data which corresponds to the configuration of the imaging lens shown in FIG. 3 is shown in FIGS. 8, 9 as Example 3. As is seen from FIGS. 2 and 3, in these examples, since the first lens and the second lens are compounded as a cemented lens, the numbers of surfaces is reduced by one compared to the lens data of Example 1.

In addition, similarly, a lens data of an imaging lens according to Example 4 is shown in FIGS. 10, 11, a lens data of an imaging lens according to Example 5 is shown in FIGS. 12, 13, and a lens data of an imaging lens according to Example 6 is shown in FIGS. 14, 15. Since sections of lenses of the imaging lenses according to Examples 4 to 6 are similar to those shown in the configuration of the imaging lens shown in FIG. 2, the illustrations thereof are omitted herein.

In the imaging lenses according to Examples 2 to 6, both surfaces of each of a third lens G3, a fourth lens G4 and a fifth lens G5 are also formed into an aspherical shape as with Example 1. Here, a configuration example in which a front surface of a third lens G3 is formed into a spherical shape and other surfaces of the third lens G3, a fourth lens G4 and a fifth lens G5 than the relevant front surface of the third lens G3 are formed into an aspherical shape is shown in FIG. 7 as Example 7. Since sections of lenses of the imaging lens according to Example 7 are similar to those shown in the configuration of the imaging lens shown in FIG. 1, the illustration thereof is omitted herein.

Values related to the conditional expressions are shown for the individual Examples altogether in FIG. 18. As is seen from FIG. 18, the values of the individual examples fall within the numerical ranges of the individual conditional expressions.

Figure 19A:
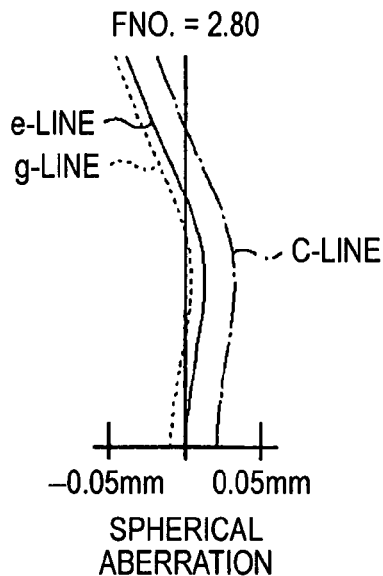
Figure 19B:
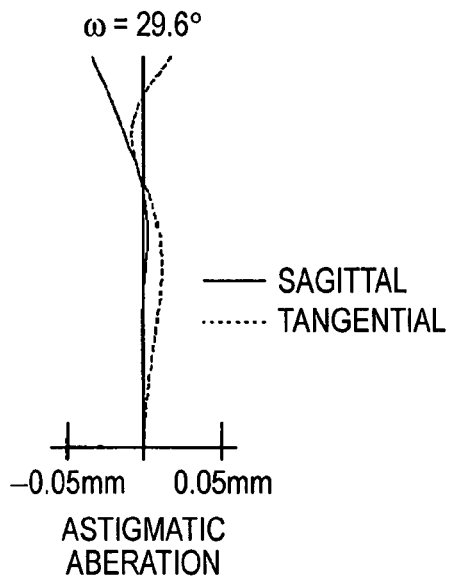
Figure 19C:
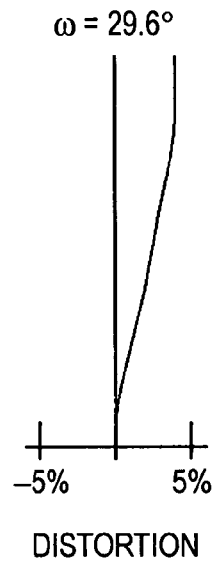

FIGS. 19A to 19C show astigmatic aberration, an astigmatic aberration and distortion in the imaging lens according to Example 1. In each aberration diagram, the aberrations are shown based on an e-line as a standard wavelength. In the spherical aberration diagram, aberrations relative to a g-line (wavelength of 435.8 nm) and a C-line (wavelength of 656.3 nm) are also shown. In the astigmatic aberration diagram, a slid line denotes an aberration in a sagital direction and a broken line denotes an aberration in a tangential direction. FNO denotes an F value, and ω denotes a half of an angle of view.

Figure 20A:
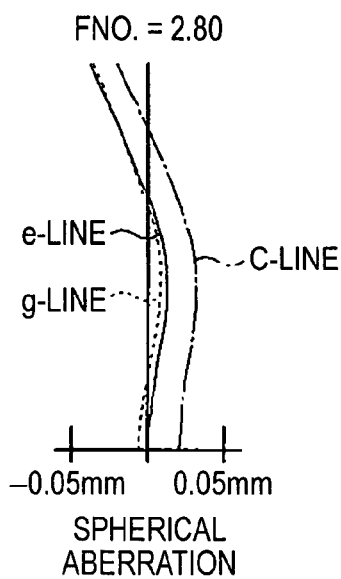
Figure 20B:
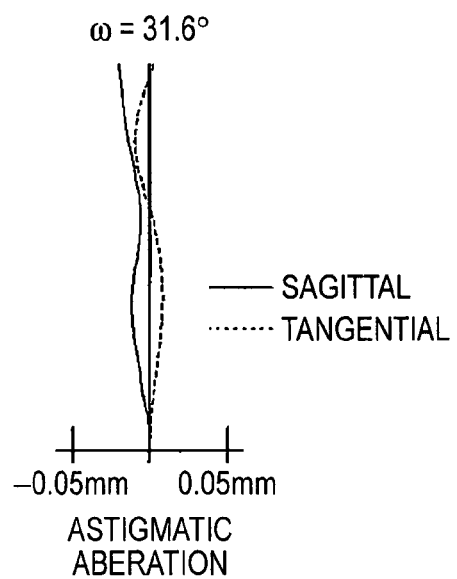
Figure 20C:
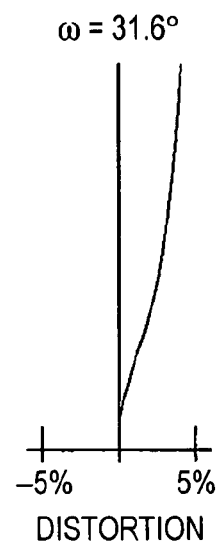
Figure 21A:
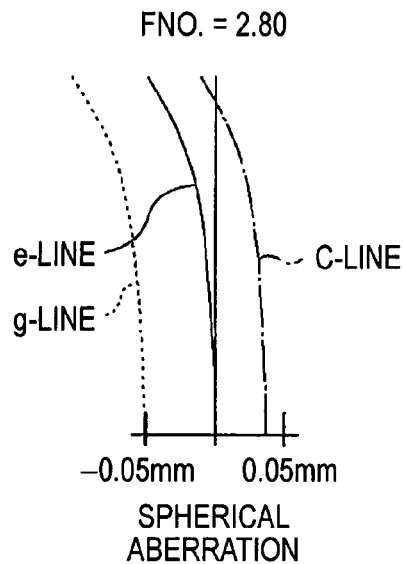
Figure 21B:
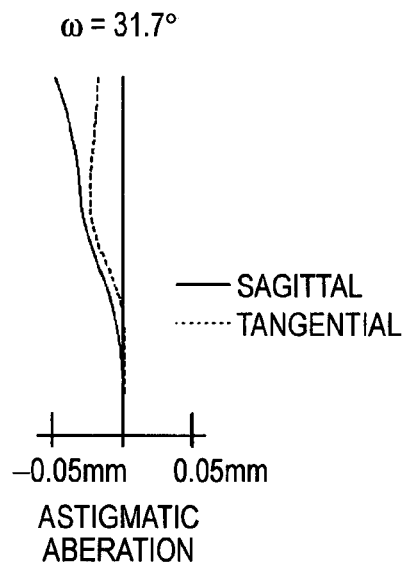
Figure 21C:
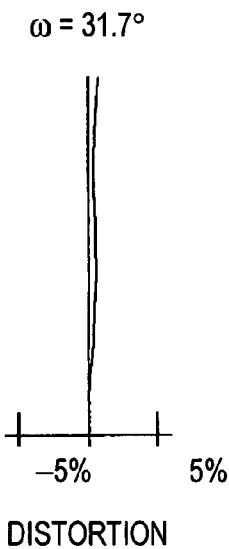
Figure 22A:
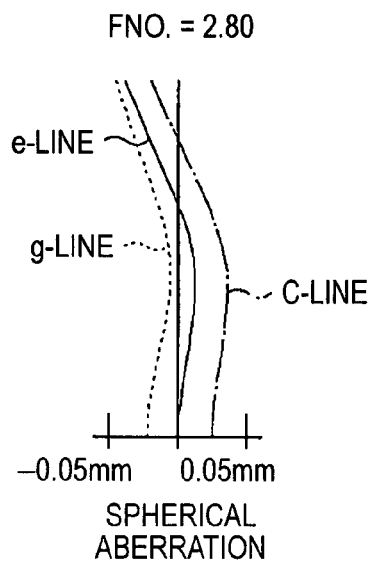
Figure 22B:
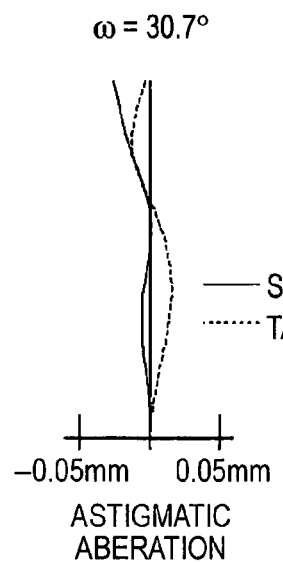
Figure 22C:
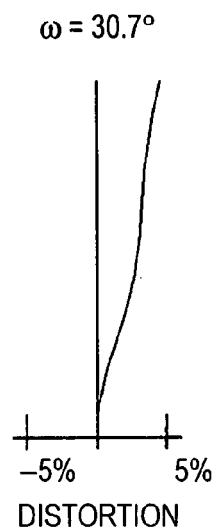
Figure 23A:
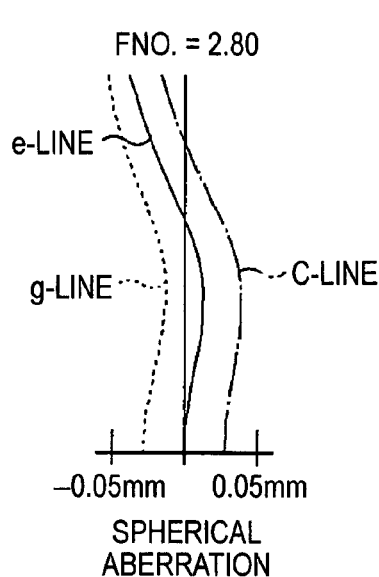
Figure 23B:
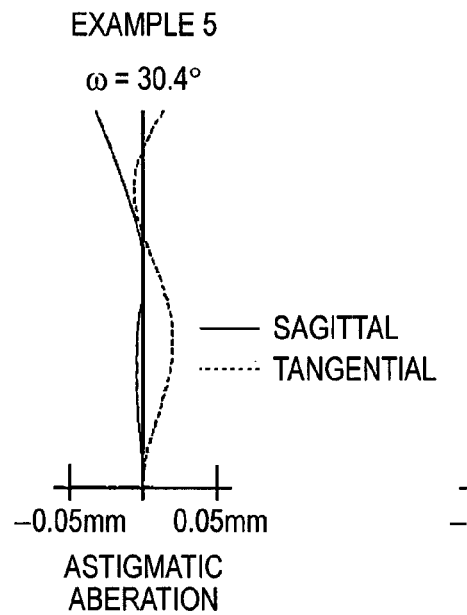
Figure 23C:
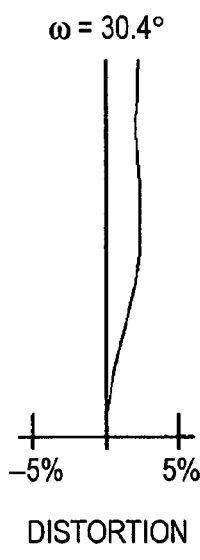
Figure 24A:
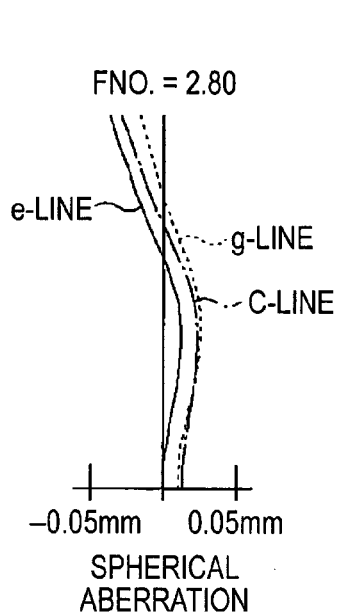
Figure 24B:
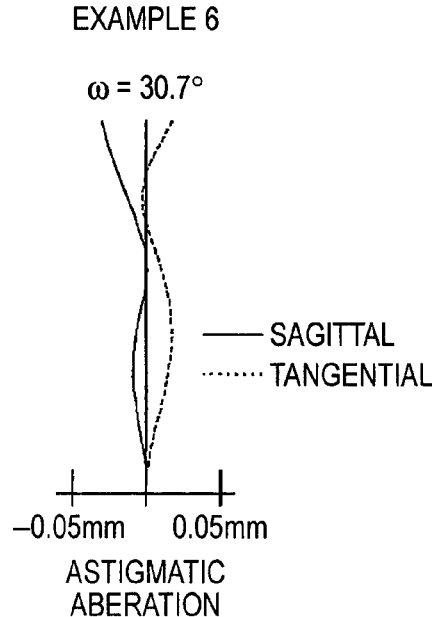
Figure 24C:
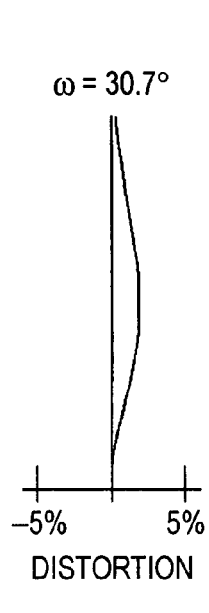

Similarly, astigmatic aberration, an astigmatic aberration and distortion in the imaging lens according to Example 2 are shown in FIGS. 20A to 20C. Similarly, those aberrations in the imaging lens according to Example 3 are shown in FIGS. 21A to 21C, those aberrations in the imaging lens according to Example 4 are shown in FIGS. 22A to 22C, those aberrations in the imaging lens according to Example 5 are shown in FIGS. 23A to 23C), those aberrations in the imaging lens according to Example 6 are shown in FIGS. 24A to 24C, and those aberrations in the imaging lens according to Example 7 are shown in FIGS. 25A to 25C.

In addition, lateral aberrations in each angle of view of the imaging lens according to Example 1 are shown in FIG. 26A to 26I, and in particular, FIGS. 26F to 26I show lateral aberrations on the sagital surface. In these lateral aberration diagrams, aberrations relative to the g-line and the C-line are also shown based on the e-line as the standard wavelength. Similarly, lateral aberrations in the imaging lens according to Example 2 are shown in FIG. 27A to 27I, lateral aberrations in the imaging lens according to Example 3 are shown in FIG. 28A to 28I, lateral aberrations in the imaging lens according to Example 4 are shown in FIG. 29A to 29I, lateral aberrations in the imaging lens according to Example 5 are shown in FIG. 30A to 30I, lateral aberrations in the imaging lens according to Example 6 are shown in FIG. 31A to 31I, and lateral aberrations in the imaging lens according to Example 7 are shown in FIG. 32A to 32I.

As is seen from the numerical value data and aberration diagrams, in each of the examples, by the lens configuration made up of the five lenses as a whole, the optimum lens material, lens surface configuration and lens power distribution are realized, whereby the high performance imaging lens systems can be realized.

Note that the invention is not limited to the embodiment and the individual numerical examples but can be modified variously. For example, the values of curvature of radius, surface space and refractive index are not limited to the values shown in the individual numerical examples but can take other values.

According to the imaging lens of the invention, since as a whole, the five-lens configuration is adopted which is made up of the first to fifth lenses, so that the number of lenses is increased compared to the conventional imaging lenses which are made up of four lenses and the optimum configuration is realized for each of the constituent lens elements, a high-performance lens system can be realized which is corrected properly with respect to the several aberrations so as to deal with the trend of larger image pickup devices and highly fined pixels which results from the tendency to increase the resolving power.

In addition, according to the imaging apparatus according to the invention, since an image of a subject formed by the high-performance imaging lens of the invention is made to be formed on the image pickup device so as to obtain an image, a highly resolved imaging image can be obtained.

The entire disclosure of each and every foreign patent application from which the benefit of foreign priority has been claimed in the present application is incorporated herein by reference, as if fully set forth.

What is claimed is:

1. An imaging lens comprising, in order arranged from an object side:

a first lens having a negative meniscus shape with a convex face directed to the object side thereof;

a second lens having a positive shape with a convex face directed to the object side thereof;

a diaphragm;

a third lens with a convex face directed to an image;

a fourth lens having a positive refractive power near an optical axis; and a fifth lens with a concave face directed to the image near the optical axis while with a convex face directed to the image towards its periphery on an image side surface thereof, wherein the imaging lens excludes between the first lens and the fifth lens, any other lens than the second to fourth lens.

2. An imaging lens as set forth in claim 1, further satisfying the following conditional expressions;

$$1.05 < f_{12}/f < 1.35 \quad (2\text{-}1)$$

$$1.68 < n_1 \quad (2\text{-}2)$$

$$17 < v_2 - v_1 < 40 \quad (2\text{-}3)$$

where, f: focal length of a whole lens system;

$f_{12}$: composite focal length of the first lens and the second lens $n_1$: a refractive index of the first lens at the e-line $v_1$: Abbe number of the first lens at the e-line $v_2$: Abbe number of the second lens at the e-line.

3. An imaging lens as set forth in claim 2, wherein at least two lenses of the third lens, the fourth lens and the fifth lens are plastic lenses, at least one side of the third lens, the fourth lens and the fifth lens is of an aspherical surface, and furthermore, the following conditional expressions are satisfied;

$$40 < v3 \quad (3\text{-}1)$$

$$40 < v4 \quad (3\text{-}2)$$

$$40 < v5 \quad (3\text{-}3)$$

where v3: Abbe number of the third lens at the e-line v4: Abbe number of the fourth lens at the e-line v5: Abbe number of the fifth lens at the e-line.

4. An imaging lens as set forth in claim 3,
wherein letting a space between the second lens and the diaphragm be $L_F$ and a space between the diaphragm and the third lens be $L_R$, the following conditional expression is satisfied;

$$5.0 < L_R/L_F < 55 \qquad (4\text{-}1).$$

5. An imaging lens as set forth in claim 4,
wherein the first lens and the second lens are compounded as a cemented lens.

6. An imaging lens as set forth in claim 5,
wherein the first lens and the second lens are glass lenses.

7. An imaging lens as set forth in claim 6, further comprising a shutter mechanism which is provided between the second lens and the third lens.

8. An imaging apparatus comprising:
an imaging lens as set forth in claim 7; and
an image pickup device that outputs an electric signal according to an image of a subject which is formed by the imaging lens.

9. An imaging lens as set forth in claim 2,
wherein letting a space between the second lens and the diaphragm be $L_F$ and a space between the diaphragm and the third lens be $L_R$, the following conditional expression is satisfied;

$$5.0 < L_R/L_F < 55 \qquad (4\text{-}1).$$

10. An imaging lens as set forth in claim 9,
wherein the first lens and the second lens are compounded as a cemented lens.

11. An imaging lens as set forth in claim 10,
wherein the first lens and the second lens are glass lenses.

12. An imaging lens as set forth in claim 11, further comprising a shutter mechanism which is provided between the second lens and the third lens.

13. An imaging apparatus comprising:
an imaging lens as set forth in claim 12; and
an image pickup device that outputs an electrical signal according to an image of a subject which is formed by the imaging lens.

14. An imaging lens as set forth in claim 1,
wherein at least two lenses of the third lens, the fourth lens and the fifth lens are plastic lenses, at least one side of the third lens, the fourth lens and the fifth lens is of an aspherical surface, and furthermore, the following conditional expressions are satisfied;

$$40 < v3 \qquad (3\text{-}1)$$

$$40 < v4 \qquad (3\text{-}2)$$

$$40 < v5 \qquad (3\text{-}3)$$

where v3: Abbe number of the third lens at the e-line
v4: Abbe number of the fourth lens at the e-line
v5: Abbe number of the fifth lens at the e-line.

15. An imaging lens as set forth in claim 14,
wherein letting a space between the second lens and the diaphragm be $L_F$ and a space between the diaphragm and the third lens be $L_R$, the following conditional expression is satisfied;

$$5.0 < L_R/L_F < 55 \qquad (4\text{-}1).$$

16. An imaging lens as set forth in claim 15,
wherein the first lens and the second lens are compounded as a cemented lens.

17. An imaging lens as set forth in claim 16,
wherein the first lens and the second lens are glass lenses.

18. An imaging lens as set forth in claim 17, further comprising a shutter mechanism which is provided between the second lens and the third lens.

19. An imaging apparatus comprising:
an imaging lens as set forth in claim 18; and
an image pickup device that outputs an electric signal according to an image of a subject which is formed by the imaging lens.

20. An imaging lens as set forth in claim 1,
wherein letting a space between the second lens and the third diaphragm be $L_F$ and a space between the diaphragm and the third lens be $L_R$, the following conditional expression is satisfied;

$$5.0 < L_R/L_F < 55 \qquad (4\text{-}1).$$

21. An imaging lens as set forth in claim 20,
wherein the first lens and the second lens are compounded as a cemented lens.

22. An imaging lens as set forth in claim 21,
wherein the first lens and the second lens are glass lenses.

23. An imaging lens as set forth in claim 22, further comprising a shutter mechanism which is provided between the second lens and the third lens.

24. An imaging apparatus comprising:
an imaging lens as set forth in claim 23; and
an image pickup device that outputs an electric signal according to an image of a subject which is formed by the imaging lens.

25. The imaging lens as set forth in claim 1,
wherein the fourth lens has a convex face on the object side near the optical axis while a concave face toward its periphery on the object side.

26. An imaging lens comprising, in order arranged from an object side;
a first lens having a negative meniscus shape with a convex face directed to the object side thereof;
a second lens having a positive shape with a convex face directed to the object side thereof;
a third lens with a convex face directed to an image;
a fourth lens having a positive refractive power near an optical axis; and
a fifth lens with a concave face directed to the image near the optical axis while with a convex face directed to the image towards its periphery on an image side surface thereof, wherein the imaging lens excludes between the first lens and the fifth lens, any other lens than the second to fourth lens.

27. An imaging apparatus comprising:
an imaging lens as set forth in claim 26; and
an image pickup device that outputs an electric signal according to an image of a subject which is formed by the imaging lens.

* * * * *